(12) United States Patent
Fujisawa et al.

(10) Patent No.: US 6,720,059 B2
(45) Date of Patent: Apr. 13, 2004

(54) FASTENER STRIP HAVING SEALING VERTICAL WALL

(75) Inventors: Nobuo Fujisawa, Macon, GA (US); Craig Jay Graham, Eastman, GA (US); Tsuyoshi Minato, Macon, GA (US); Ryuichi Murasaki, Toyama-ken (JP); Mitsuru Akeno, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/972,353

(22) Filed: Oct. 5, 2001

(65) Prior Publication Data

US 2002/0164451 A1 Nov. 7, 2002

Related U.S. Application Data

(63) Continuation-in-part of application No. 09/848,878, filed on May 4, 2001, now abandoned.

(51) Int. Cl.$^7$ ............................................... A44B 21/00
(52) U.S. Cl. ..................... 428/100; 428/99; 428/119; 428/192; 24/442
(58) Field of Search ..................... 428/99, 100, 119, 428/192; 24/446, 443, 442, 452

(56) References Cited

U.S. PATENT DOCUMENTS

| 3,408,705 A | * | 11/1968 | Kayser et al. | ............... 428/100 |
| 5,058,245 A | * | 10/1991 | Saito | ........................ 24/442 |
| 5,067,210 A | * | 11/1991 | Keyaki | ....................... 24/442 |

* cited by examiner

*Primary Examiner*—Alexander S. Thomas
(74) *Attorney, Agent, or Firm*—Finnegan, Henderson, Farabow, Garrett & Dunner, L.L.P.

(57) ABSTRACT

This invention provides a fastener strip in which fastening elements form a fastener layer on a front face of the fastener strip. Rows of vertical members are disposed along each of the side edges of the fastener layer and each row comprises vertical members formed with an appropriate interval between them for controlling the degree of foam penetration during the molding process. The vertical members anchor the fastener strip to an object during molding of the object and form an effective seal against fouling of the fastening elements.

22 Claims, 24 Drawing Sheets

FASTENER STRIP HAVING SEALING VERTICAL WALL

This Application is a continuation-in-part of pending U.S. patent application Ser. No. 09/848,878 filed May 4, 2001 abandoned.

BACKGROUND OF THE INVENTION

1. Field of the Invention

This invention is in the area of hook-and-loop fastener strips, specifically a hook or loop fastener strip with vertical sealing members located along side edges of a fastener layer. This invention is also in the area of a method for integrally molding the fastener strip with an object, such as a foam-molded product like a cushion body used for an automobile seat. The vertical sealing members form an effective seal against fouling of the hooks or loops when the strip is in-molded into the object.

2. Description of the Related Art

It can be appreciated that an automobile seat is so constructed that its cushion body is covered with a surface material and adopts a recessed shape in order that a passenger can maintain a sitting posture and not feel tired even after sitting for a long time. In a seat having such a recessed shape, a foam-molded product, in which a fastener strip is anchored in a recessed portion thereof as shown in FIG. 29, is employed both as a cushion body and as a means of preventing the surface material from shifting on the recessed portion. By engagement between fastening elements of the fastener strip anchored in the cushion body and mating fastening elements mounted on the surface material, the surface material is prevented from shifting.

For manufacturing the cushion body with which the fastener strip is integrated, the fastener strip is placed in a predetermined mold in such a manner that its fastening element-side face opposes a mold face and then, foam resin material is poured into the mold. By urging the foam resin material to be foamed, the foam-molded product with which the fastener strip is integrated is produced.

At the time of molding, the foam resin may penetrate between the fastening elements of the fastener strip so as to foul the fastening elements, thereby reducing its engaging function.

Various means of sealing the hooks or loops of an in-molded fastener strip against fouling during the molding process are known in the art. Among the different sealing means that have been disclosed are the following:

Foam strips located along the sides of the fastener layer are shown in U.S. Pat. Nos. 5,500,268 and 5,614,045, both to Billarant. In addition, a foam layer which forms a perimeter seal around the hook or loops is disclosed in U.S. Pat. No. 5,766,723 to Oborny.

Plastic ridges which form a seal against the walls of the mold recess are shown in U.S. Pat. No. 5,900,303 to Billarant and U.S. Pat. No. 5,688,576 to Ohno et al. Similar flexible sealing lips, located along each side of the fastener strip, are disclosed in U.S. Pat. No. 5,061,540 to Cripps et al.

A different approach is taken by U.S. Pat. No. 4,693,921 to Billarant et al., U.S. Pat. No. 5,766,385 to Pollard et al., and U.S. Pat. No. 4,563,380 to Black et al.; wherein a protective cover in the form of a film or tape is placed over the hook or loop elements, and then that protective cover is removed after the molding process is complete.

Japanese Utility Model publication No.HEI4-53685 and Japanese Utility Model publication No.HEI6-37712, for example, have disclosed sealing means in which in order to prevent fouling of the fastening elements as mentioned above, a belt-like body or a fastening member is formed on each of both end portions of a fastener strip so as to prevent penetration of foam resin to a surface with the fastening elements. Further, Japanese Patent Application Laid-Open No.SHO60-179003 discloses sealing means in which the fastening elements are entirely covered with a film so as to prevent penetration of the foam resin to the area of the fastening elements during the molding.

In situations where the belt-like body or the fastening member is formed on each of the end portions of the fastener strip, the anchoring force between the fastener strip and a molded product decreases although the penetration of the foam resin into the area of the fastening elements is prevented. Therefore, as in Japanese Utility Model Publication No.HEI4-53685, it is necessary to further attach an anchoring member on a rear face of the fastener strip and fasten this anchoring member to the molded product so as to prevent reduction of the anchoring force between the fastener strip and the molded product. Further, in the case of Japanese Utility Model Publication No.HEI6-37712, the fastening member is composed of unwoven cloth, so that the foam resin is absorbed in this unwoven cloth so as to anchor the fastener strip to a molded product.

In the case of Japanese Patent Application Laid-Open No.SHO60-179003, when the molded product is taken out of a molding die after molding is finished, it is necessary to remove the film, which covers the fastening elements. If such a film is employed, that is to be melted by heat when the foam resin is foamed, non-melted film remains on the fastening elements as a residue thereby leading to reduction of the engaging force.

As for the production method for the foam-molded product in which the fastener strip is molded integrally in the foam-molded product, it is conventionally known that a recess for accommodating the fastening elements of the fastener strip can be formed in a molding die face in order to prevent the foam resin from invading into the area of the fastening elements of the fastener strip, so that the recess blocks the foam resin from invading into the area of the fastening elements, as shown in Japanese Patent Application Laid-Open No.HEI1-163019.

The majority of the above methods, however, exhibit a major disadvantage in that the sealing means are not formed of one piece with the fastener layer, but rather are formed from a different material which is later attached to front of the fastener layer. This increases manufacturing cost and complexity vs. a fastener strip which has its sealing means integrally formed of one piece with the fastening layer.

In addition, the prior art which employs a protective cover to prevent fouling has a further disadvantage—the cover must be removed after molding is completed, introducing an often messy and time-consuming extra step into the molding process.

Accordingly, several objects and advantages of the invention are:

The vertical members which form the anti-fouling seal can be easily formed of one piece with the rest of the fastener layer, using commonly available forming dies or wheels. This reduces steps and cost in the manufacturing process.

The vertical members permit a controlled amount of penetration by the foam as it cures, such that some degree of anchoring of the fastener strip to the object being molded is achieved. Indeed, the spacing of the vertical members can be varied to allow greater foam penetration at the outer edges of the strip, for optimal anchoring; and minimal to no penetration at some distance inward from the edges, for optimal sealing.

The non-continuous nature of the vertical members—that is, they do not form a continuous stiff wall—allows the edges of the fastener strip to flex if needed along their length, to accommodate curved or uneven mold surfaces and still seal well.

Further objects and advantages of the invention will become apparent from a consideration of the drawings and ensuing description.

SUMMARY OF THE INVENTION

The present invention is a fastener strip having a hook or loop, in which vertical sealing members arranged in line with a predetermined interval, are provided. The aforementioned vertical members are preferred to be disposed in a staggered manner in a lengthwise direction. The vertical members form an effective seal against fouling of the hooks or loops when the strip is in-molded into an object.

To achieve the above objective, according to a first aspect of the present invention, there is provided a fastener strip to be integrated with a surface of a foam-molded product for attaching a surface material, the fastener strips comprising vertical members formed on both side edge portions of a surface of a flat substrate made of thermoplastic resin along a length thereof, and a plurality of fastening elements formed in an area surrounded by the vertical members, wherein the vertical members are arranged in at least one row in the length direction, and a gap allowing passage of foam resin is formed between adjacent vertical members.

In this fastener strip, the vertical members are provided on each side edge and are arranged in at least one row in the length direction. The vertical members have the function of restricting penetration of the foam resin into a region inside the vertical members where a plurality of the fastening elements are formed, as well as the function of anchoring the foam resin, which invades through the gaps between the adjacent vertical members and surrounds the vertical members. According to the present invention, not only can the structure of the fastener strip be simplified, but also the function of anchoring the fastener strip to a molded product without using any additional anchoring member can be improved.

Preferably, each of the gaps between the adjacent vertical members is formed as an aisle of a predetermined length in the passage direction of foam resin, so that the penetration of the foam resin into the area of the fastening elements through the aisle is restricted. Consequently, the fastener strip has the function not only of restricting the amount of penetration of the foam resin into the area of the fastening elements due to resistance in the aisle, but also the function of anchoring the fastener strip firmly by increasing the contact area between the foam resin and the vertical members.

Further, preferably, the aisle has a stopper portion. Specifically, the fastener strip has an aisle with the stopper portion having a small gap, that is, the aisle is blind. The stopper portion can prevent the penetration of the foam resin into the area of the fastening elements. Further, such a blind portion allows the vertical member to exert its function as an anchoring member.

Preferably, the substrate and the vertical members or the substrate, vertical members and fastening elements are molded integrally with thermoplastic resin. Because the substrate and vertical members or the substrate, vertical members and fastening elements are formed integrally with thermoplastic resin such as polyester, polyamide, polypropylene, polyvinyl chloride, the fastener strip can be manufactured continuously.

A portion of the fastening elements formed inside the vertical members may also function as anchor members for the foam resin passing through the gap. The foam resin passing, the aforementioned gaps is restricted from invading further by a portion of the fastening elements formed inside the vertical members.

Preferably, at least two rows of the vertical members are provided on each edge portion of the substrate along the length thereof, and at least two rows of the outermost vertical members disposed on each side edge are arranged in line along the length of the fastener strip, while the vertical members in an inner row adjacent the outer rows of vertical members are disposed in a staggered manner.

By disposing two rows of the vertical members in a staggered manner, the foam resin passing through the gaps between the outer vertical members is interrupted by the inner wall portions so that its flow is changed to the right and left directions. Consequently, the foam resin intending to pass the gaps between the inner vertical members is restricted. Further, the foam resin makes contact with the front and rear faces of the outer vertical members so that the vertical members are anchored further firmly by the foam resin.

It is permissible that at least two rows of the vertical members are provided on each side edge along the length and at least one of the outermost rows of vertical members disposed on each side edge includes a plurality of vertical members along the length thereof, while the vertical member located inside the outermost row of vertical members is continuous.

The foam resin, having passed the gaps between the vertical members while being restricted by the outside wall, is prevented from invading into the area of the fastening elements by the continuous vertical member located inside.

Preferably, a plurality of fastening element groups are formed along the length of the substrate surface and each of the fastening element groups is surrounded by at least one vertical member and transverse wall portions. Thus, a plurality of the fastening element groups are defined along the length of the substrate surface, and each fastening element group is surrounded by the at least one vertical member and the transverse wall portions so as to restrict the penetration of the foam resin into the area of the fastening elements.

Each of the aforementioned transverse walls adjacent the fastening element groups may be formed of either a continuous vertical member or plural intermittent vertical members disposed with an interval. The continuous vertical members or intermittent vertical members surrounding the fastening element groups can reliably prevent the foam resin passing the vertical members located on both side edges from invading into the area of the fastening elements.

If the surface of the molding die for manufacturing a foam-molded product is flat, the heights of the aforementioned vertical members and the transverse walls are preferred to be larger than that of the fastening elements. When a surface fastener is placed on the surface of the molding die, the vertical members and the transverse walls make tight contact with the surface of the mold, so that there is no gap between the vertical members/transverse walls and the surface of the mold. Consequently, the penetration of the foam resin into the area of the fastening elements through the gaps between the vertical members and the surface of the mold can be prevented effectively.

If recesses for receiving the fastening elements are formed in the surface of the mold for producing a foam-molded product, the heights of the vertical member and transverse walls may be smaller than that of the fastening elements. When a surface fastener is placed on the surface of the mold, the groups of the fastening elements fit down into the recesses in the surface of the molding die, so that the vertical members and the transverse walls come into firm contact with the surrounding of the recess portion. Consequently, there is no gap formed between the vertical members/transverse walls and the mold. Thus, the penetration of the foam resin through the gaps between the vertical members/transverse walls and the surface of the mold can be prevented effectively.

If a magnet is buried in the mold, it is preferable that at least part of the substrate, fastening elements and vertical members contain magnetically attractable powder of alloy such as iron, cobalt, nickel or the like. When the fastener strip is placed on the surface of the mold for manufacturing a foam-molded product, the fastener strip can be positioned and anchored at an appropriate position of the mold due to magnetic attraction between the magnetically attractable powder in the fastener strip and the magnet provided in the mold. Further, the fastener strip is prevented from moving from said position when the foam resin is foamed, so that no gaps are made between the vertical members and the surface of the mold.

At least a rear face of the substrate can be provided with a magnetically attractable body. The magnetically attractable body to be provided on the fastener strip may include a metallic thin piece of alloy such as iron, cobalt, nickel or the like, a magnetically attractable tape, knitted cloth or unwoven cloth made of metallic fiber or resin fibers mixed with magnetically attractable powder. These materials can be provided at a position where a magnetically attractable body is provided, such as a rear face or a front face of the substrate. It is preferable to provide the magnetically attractable body on the rear face of the substrate in order to simplify the manufacturing process or the structure of the mold. This magnetically attractable body may be a resin layer mixed with magnetically attractable powder of iron, cobalt, nickel or the like. This resin layer is formed on the rear face of the substrate by bonding or coating using an appropriate means such as resin adhesive agent, resin coating or the like.

At least part of the substrate, fastening elements and vertical members may be formed of thermoplastic resin mixed with magnetically attractable powder. Alternately, a magnetically attractable laminate layer or a magnetically attractable coating film containing magnetically attractable powder may be formed at least on the top faces of the vertical members.

The present invention is preferably applied to the case where the foam-molded product is a cushion body for an automobile. In the cushion body of an automobile seat or the like, the foaming-molded product is used as a pad in the cover. The fastener strip is anchored to the cushion body made of the foam-molded product and is coupled with mating fastening elements provided on the cover. As a result, installation and removal of the cover with respect to the cushion body are facilitated.

According to another aspect of the present invention, there is provided a method for molding a surface fastener integrally with a surface of a foam-molded product with the fastening elements of the fastener strip exposed outside. The fastener strip is placed with the fastening elements and the vertical members opposing the surface of the mold and positioned at an appropriate position. Then, foam resin material is poured into the mold and allowed to invade into gaps between adjacent vertical members, and the foam resin material is foamed so as to form a foam-molded product. As a result, the fastener strip is anchored integrally with the surface of the foam-molded product.

DETAILED DESCRIPTION OF THE INVENTION

Figure 1:
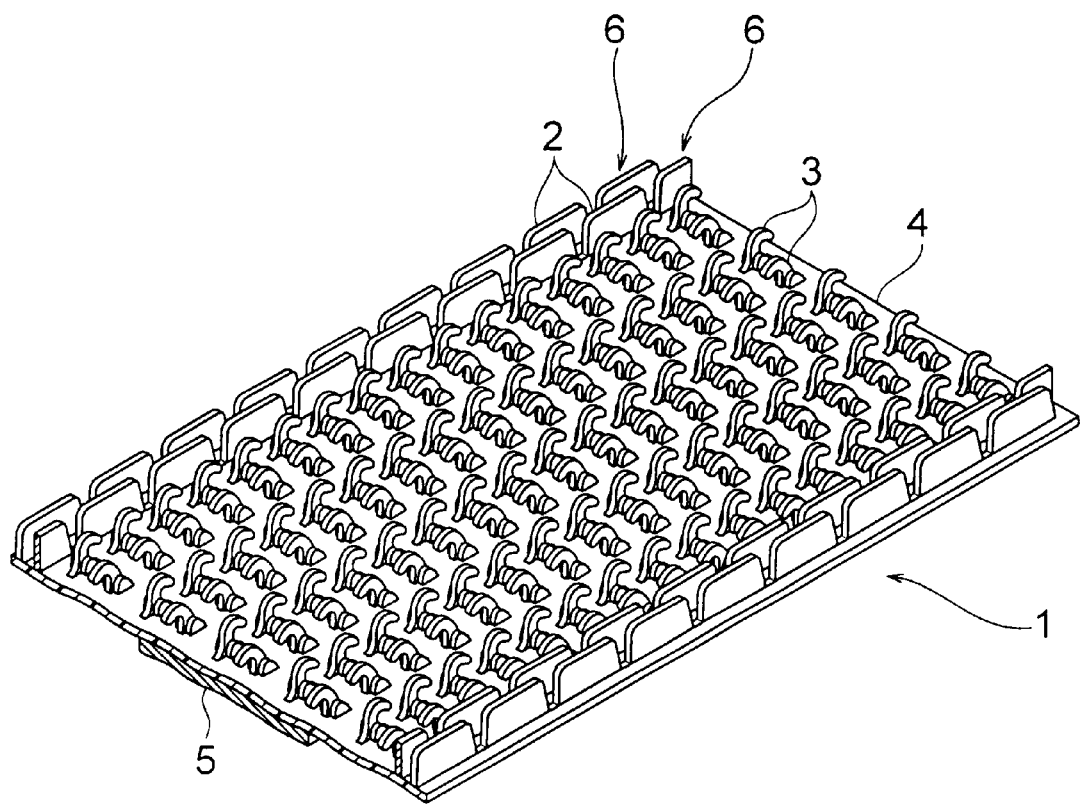
FIG. 1 is a perspective view of a fastener strip according to the present invention.
Figure 2:
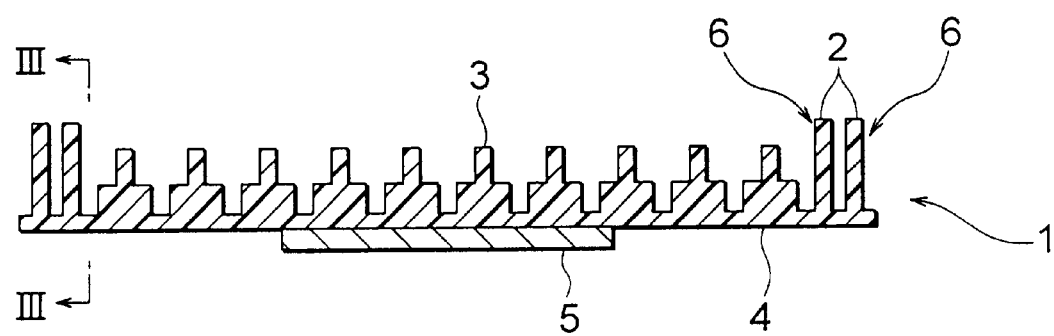
FIG. 2 is a transverse sectional view of the fastener strip shown in FIG. 1.
Figure 3:
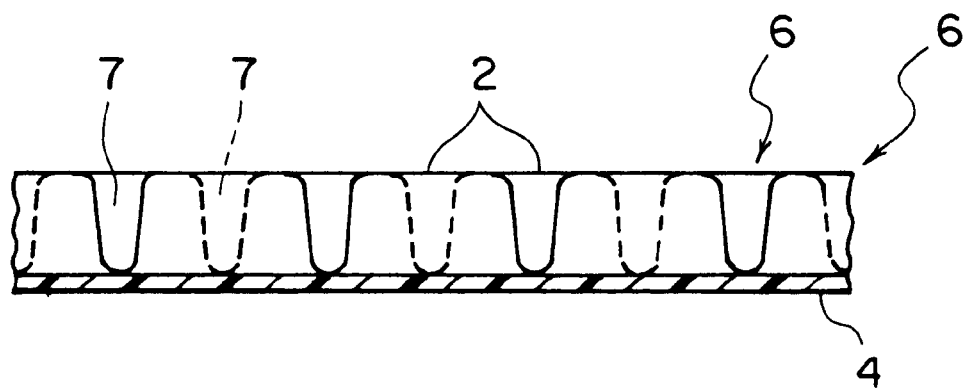
FIG. 3 is a sectional view taken along the line III—III of FIG. 2.

Hereinafter, reference numerals for use in the drawings of this specification are as follows:
1: fastener strip
2: vertical member
3: hook-like fastening element
4: substrate
5: magnetically attractable body
6: vertical member resin
7: gap
8: anchor element
9: mold
9a: upper mold
9b: lower mold
10: foam resin
11: magnet
12: stopper portion
13: mold surface
14: closely spaced vertical member
15a, b, c, d, e: transverse wall
16a, b, c, d, e: perimeter wall
17: loop-like fastening element
18: ladder wall
19a, b, c, d, e f: transverse rung Hereinafter, typical embodiments of the present invention will be described in detail with reference to the accompanying drawings. FIGS. 1 to 3 show the first embodiment of the present invention.

As shown in FIG. 1, the fastener strip 1 of the present invention is provided with hook-like fastening elements 3 on a surface of a flat substrate 4 thereof except both side edge portions. Two rows of vertical members 2, arranged in a length direction of, the fastener strip 1, are provided on each of the side edge portions. The substrate 4 and the vertical members 2 or the substrate 4, the vertical members 2 and the hook-like fastening elements 3 can be molded integrally with thermoplastic resin. The substrate 4 has a magnetically attractable body 5, which attracts a magnet 11 provided in a mold 9 so that the fastener strip 1 can be positioned within the mold 9.

As for the magnetically attractable body 5, a long metallic thin plate may be attached to a rear face of the substrate 4. Alternatively, it is permissible to form a magnetically attractable film layer on the substrate 4 by coating the rear face of the substrate 4 with magnetically attractable resin such as adhesive agent, resin coating or the like mixed with magnetically attractable powder. Further, it is permissible to mold any one of the substrate 4, the fastening elements 3 and the vertical members 2 or appropriate combination of them using thermoplastic resin mixed with magnetically attractable powder. Further alternatively, it is permissible to form a magnetically attractable laminate layer, which is formed by laminate processing, or a magnetically attractable film layer formed by coating with thermoplastic resin containing magnetically attractable powder on at least the top faces of the vertical members 2. Meanwhile, the magnetically attractable laminate layer or the magnetically attractable film may be formed on front faces of the vertical members 2 as well as the top faces of the vertical members 2.

The hook-like fastening element 3 is formed in a shape of a hook whose front end is bent toward the surface of the substrate 4. The hook-like fastening element 3 may be formed in an appropriate shape such as a mushroom or a palm tree in place of the hook. Alternatively, a fiber-made fastener strip, in which hook-like, mushroom-like or loop-like fastening elements exist independently or mixedly on a surface of a knit or woven base cloth, may be bonded to the substrate 4.

As shown in FIG. 1, the vertical members are arranged in line, and two rows of vertical members 2 are provided on each of the edge portions on the right and left of the strip. As shown in FIG. 2, the height of the vertical members 2 is higher than that of the hook-like fastening elements 3. This is because when the fastener strip 1 is placed in the mold 9, no gap should be formed between the placing face of the mold 9 and the vertical members 2. If no gap is to be formed between the top faces of the vertical members and the placing face of the mold 9 because of plasticity of the engaging members, magnetic force between the magnet 11 provided on the mold 9 and the magnetically attractable body 5 formed on the fastener strip 1, configuration of the mold 9 or the like, the height of the vertical members 2 does not have to be higher than that of the hook-like fastening elements 3.

As shown in FIG. 3, the vertical members 2 are formed with a predetermined length along the length of the fastener strip 1, and there is provided a gap 7 between each pair of adjacent vertical members 2. The plural vertical members 2 formed outside and plural vertical members 2 formed inside are disposed in a staggered manner with respect to each other. Thus, it is evident that the fastening elements 3 are not directly open to the side portions of the fastener strip 1 because the existence of these vertical members 2.

Although these vertical members 2 are provided to prevent the foam resin 10 from invading between the fastening elements 3, not all of the foam resin 10 can be blocked from invading, but part thereof is allowed to invade into the inside of the vertical members through the gaps 7 between the vertical members 2. Thus, the fastener strip 1 is anchored by the vertical members 2 and the foam resin 10 which invades through the gaps 7.

As a result, the vertical members 2 prevent the foam resin 10 from invading into the area of the fastening elements 3 thereby preventing reduction of the function of the fastening elements 3. Further, both faces of the vertical members 2 are gripped by the foam resin. Consequently, the fastener strip 1 is integrated with the molded product, so that a strong anchoring function is assured.

Figure 4:
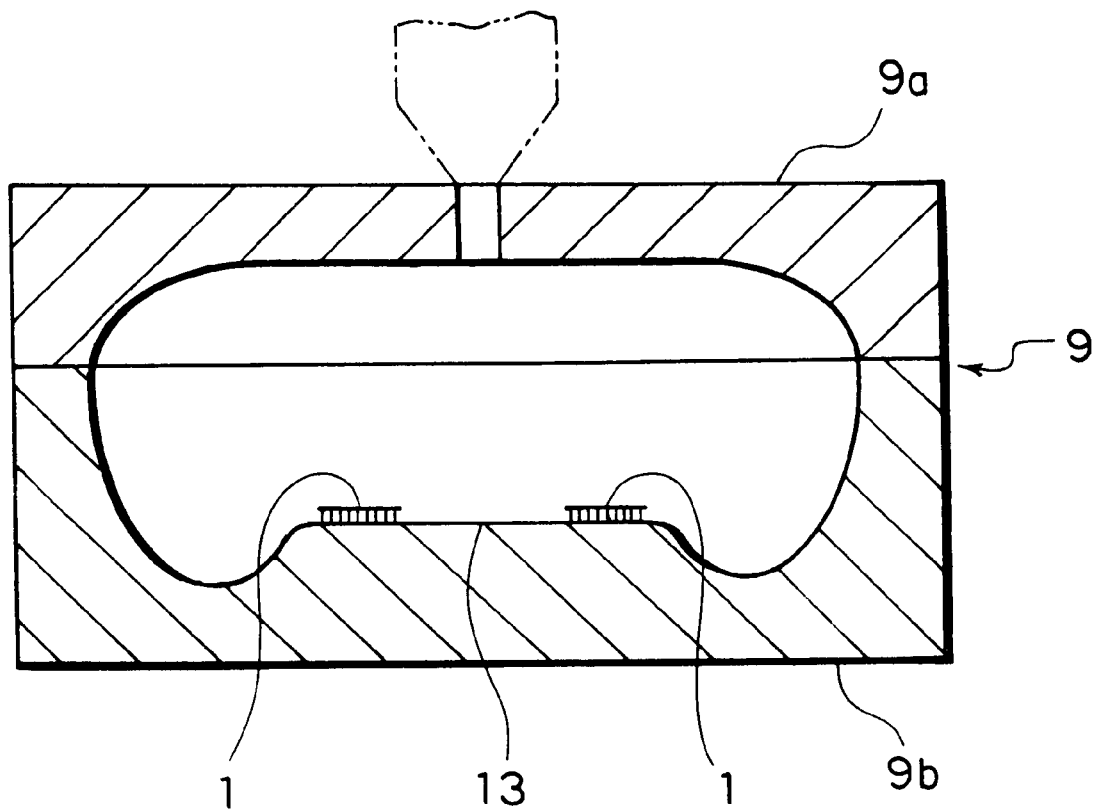
FIG. 4 is a sectional view in which the fastener strip is placed in a cavity within the molding.
Figure 5:
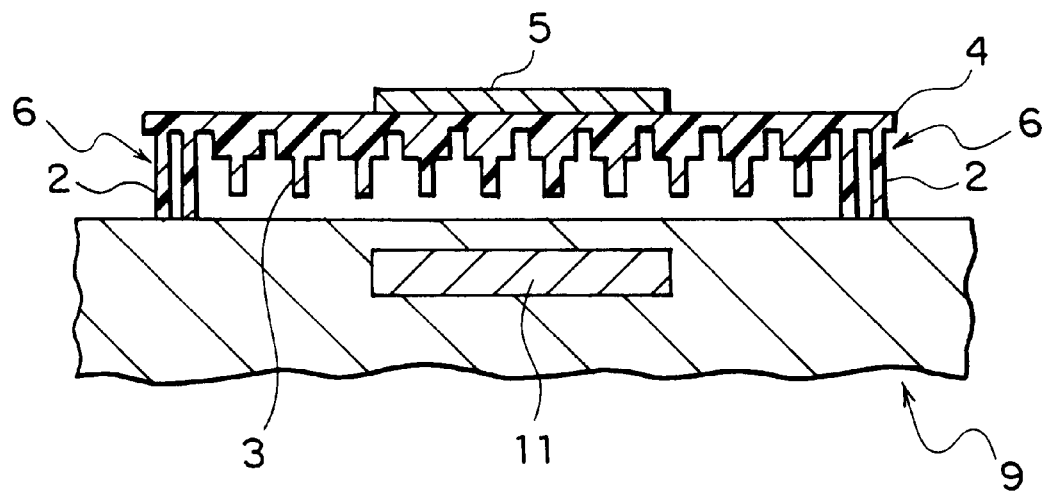
FIG. 5 is a sectional view of a major portion of the mold the fastener strip is disposed.
Figure 6:
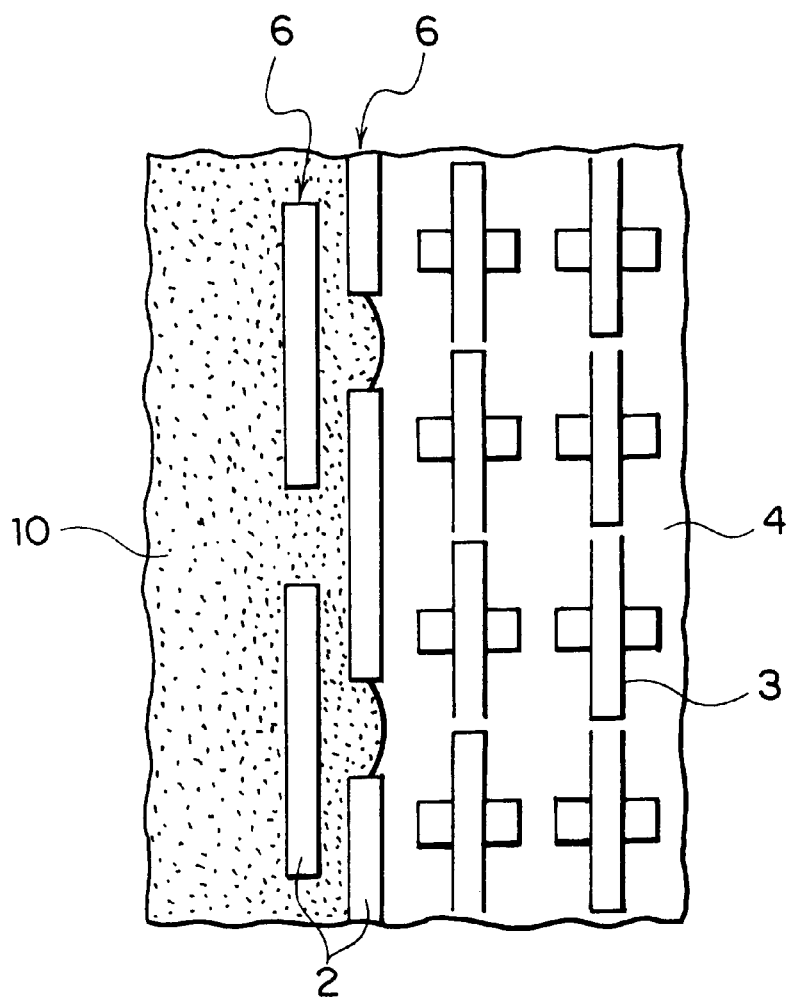
FIG. 6 is a view showing a condition in which foam resin has penetrated inside the vertical members after the form-molding.
Figure 7:
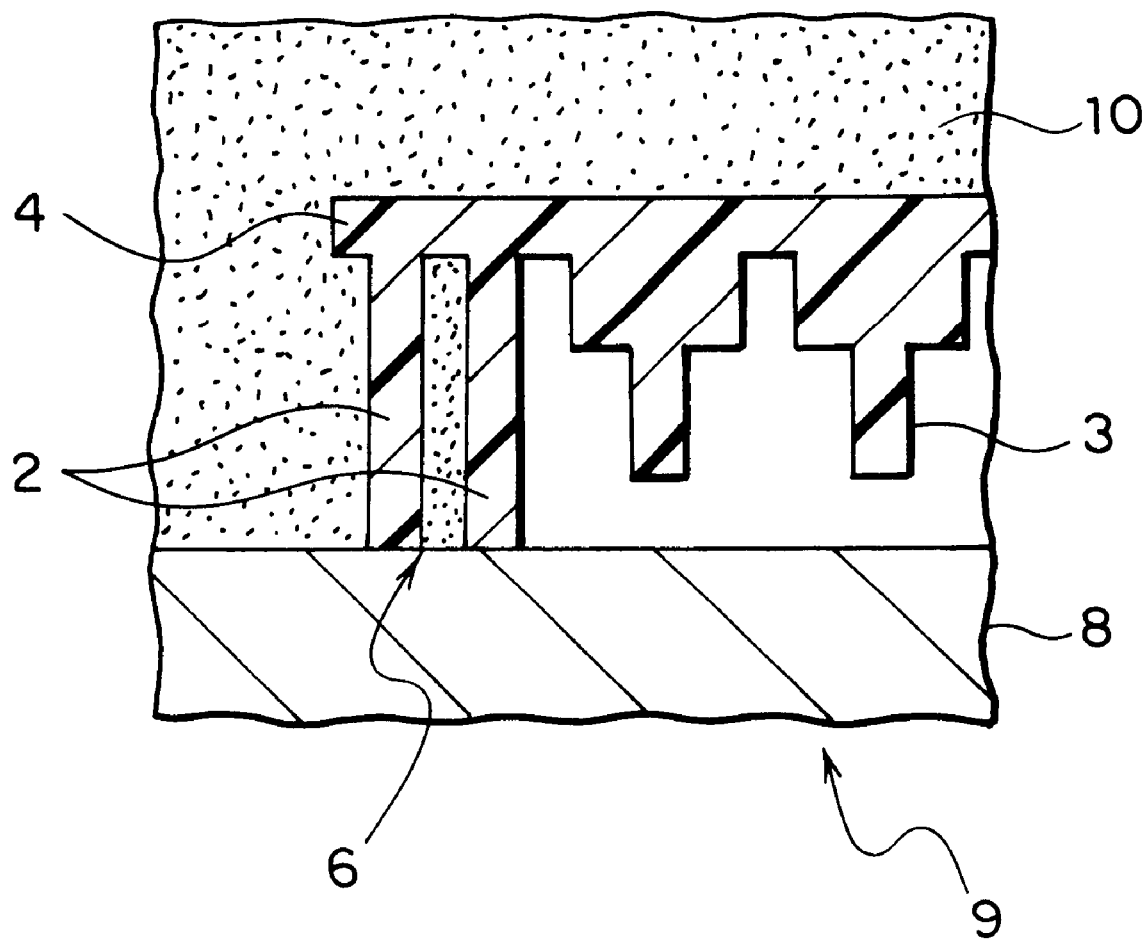
FIG. 7 is a sectional view of a major portion of the foam resin material which has been poured into the mold and foamed.

FIGS. 4 and 5 show a condition in which the fastener strip 1 of the present invention is placed inside the mold 9 for producing the foam-molded product. FIGS. 6 and 7 show the fastener strip 1 being molded. The fastener strip 1 is placed in the mold 9 such that the fastening elements 3 and the vertical members 2 oppose the mold surface 13. At this time, as shown in FIG. 5, no gap is formed between the vertical members 2, and the mold surface 13 due to the magnetic attraction between the magnetically attractable body 5 provided on the fastener strip 1 and the magnet 11 provided on the mold 9, so that the position of the fastener strip 1 is fixed.

In this state, if foam resin is poured into the inside of the mold 9, the foam resin 10 invades through the gaps 7 between the outer vertical members 2 and advances to rear faces of the inner vertical members 2, so that the penetration of the foam resin 10 is interrupted by the inner vertical members 2. Consequently, the invading foam resin 10 is forced to contact the rear faces of the outer vertical members 2. Consequently, the foam resin 10 is anchored firmly to the foam resin molded product.

The foam resin 10 advancing to the rear faces of the outer vertical members 2 goes through the gaps between the outer and the inner vertical members 2, and then, passes through the gaps 7 between the inner vertical members 2, so that it invades into the area of the fastening elements 3.

The penetration amount of the foam resin 10 cannot be specified uniformly because it changes depending on its viscosity, the pressure applied at the time of heating and the like. The penetration of the foam resin 10 can be suppressed by increasing the number of rows of vertical members 2 or prolonging the length of the vertical members 2 so as to widen the area in which the foam resin 10 contacts the vertical members 2 so that frictional resistance generated therein can be increased.

If the mold surface 13 is curved, the fastener strip 1 needs to have flexibility which allows itself to be deformed easily along the curved surface without forming any gap between the vertical members 2 and the mold surface 13, when the fastener strip 1 is placed on the mold surface 13. The gaps 7 provided between the adjacent. vertical members 2 act to secure flexibility of the fastener strip 1.

For the above reasons, it is necessary to select a preferred embodiment of the vertical members by taking into account the molding condition of the foam resin and flexibility of the surface fastener.

Figure 8:
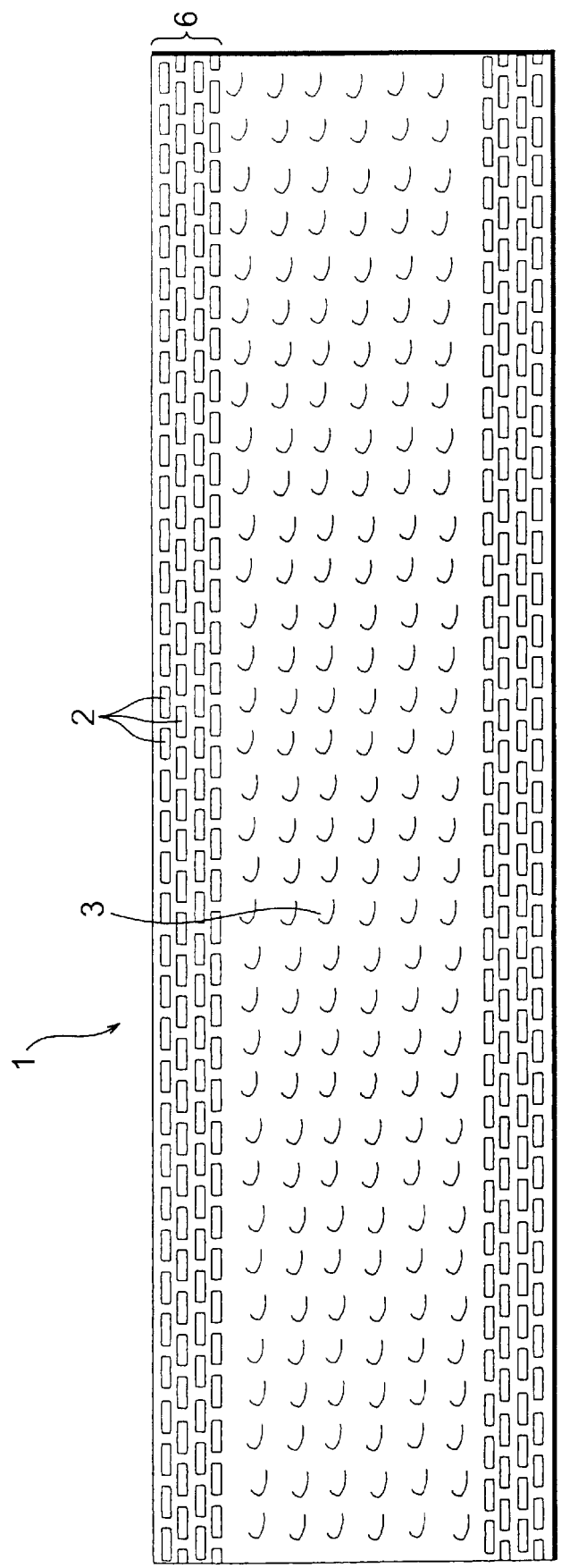
FIG. 8 is a top view of the present invention showing vertical members disposed along side edges of the fastener layer.

FIG. 8 is a top view of fastener strip 1 of the invention. A plurality of hook-like fastening elements 3 form a fastening layer covering the majority of the front face of fastener strip 1. A plurality of vertical members 2 are located along the longitudinal sides of fastener strip 1, said vertical members 2 being suitably spaced to allow a controlled degree of foam penetration during the molding process. The vertical members 2 are block-like in shape, disposed in a staggered manner, and stand upward from the front surface of fastener strip 1.

Figure 9:
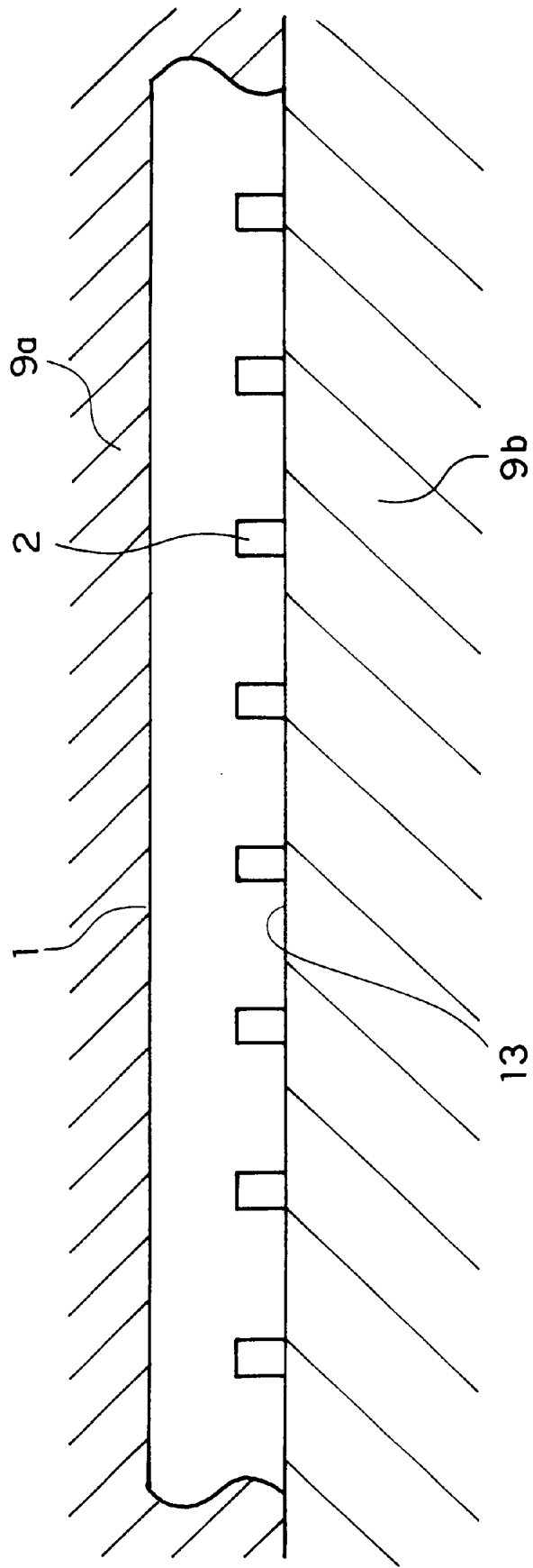
FIG. 9 is a side view showing a condition in which the vertical members form a seal against the surface of the foam mold.

FIG. 9 is a side view of a portion of the FIG. 8 fastener strip, with a mold surface 13 shown in cutaway side view. It should be noted that the second row of staggered vertical members 2, that is, the row second from the edge of fastener strip 1, is partly visible through the gaps in the first row of the staggered vertical members 2. It can also be appreciated that because the staggered vertical members 2 do not form a continuous wall along the side edges of fastener strip 1, a certain amount of flexibility is retained by those side edges. This flexibility is advantageous, in that it allows fastener strip 1 to adapt to curved or uneven mold surfaces while still sealing well against fouling of the fastening elements.

Figure 10:
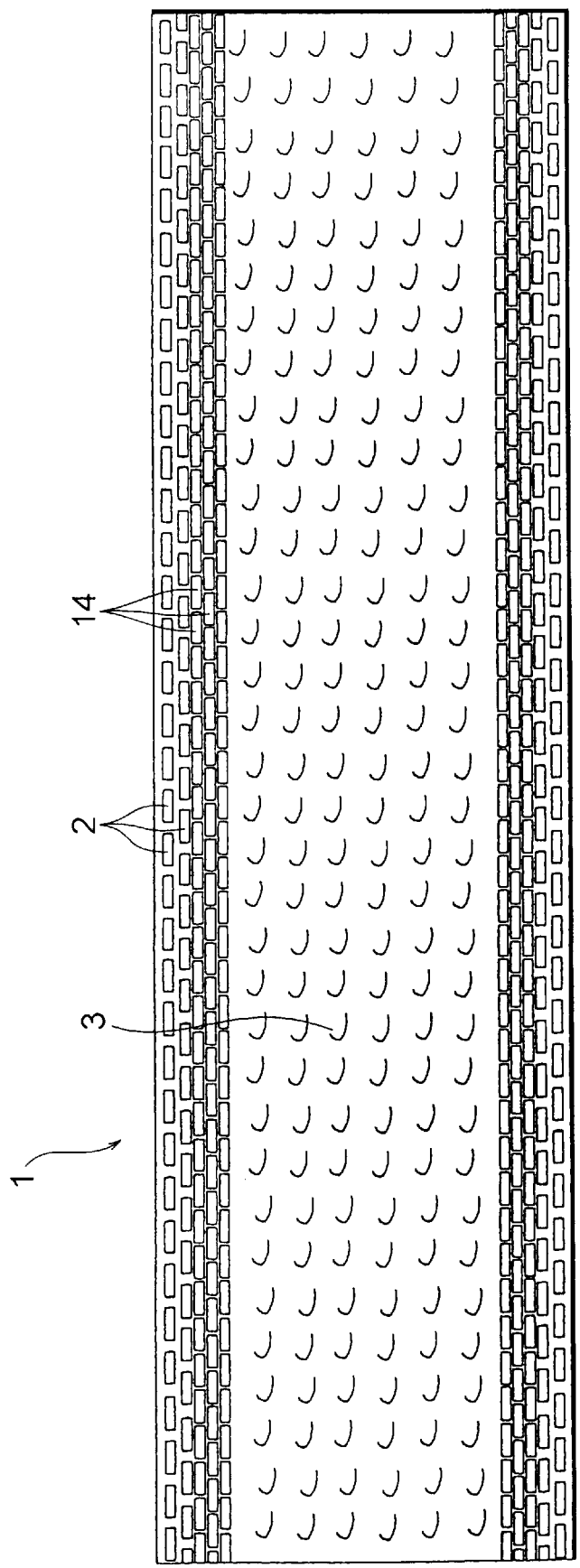
FIG. 10 is a top view of another embodiment in which vertical members have various intervals, not regular ones.

FIG. 10 illustrates an alternative embodiment, wherein the spacing of the staggered vertical members 2 varies across the width of fastener strip 1. On each longitudinal side edge of fastener strip 1, two rows of the staggered vertical members 2, are located to the outside of three rows of closely spaced vertical members 14. The closely spaced vertical members 14 are similar in shape to the staggered vertical members 2; however, their closer spacing permits little or no foam penetration during the molding process. Thus, the staggered vertical members 2 in combination with the closely spaced vertical members 14 enable both the anchoring of fastener strip 1 to the object being molded, and the sealing of hook-like fastening elements 3 against fouling.

Figure 11:
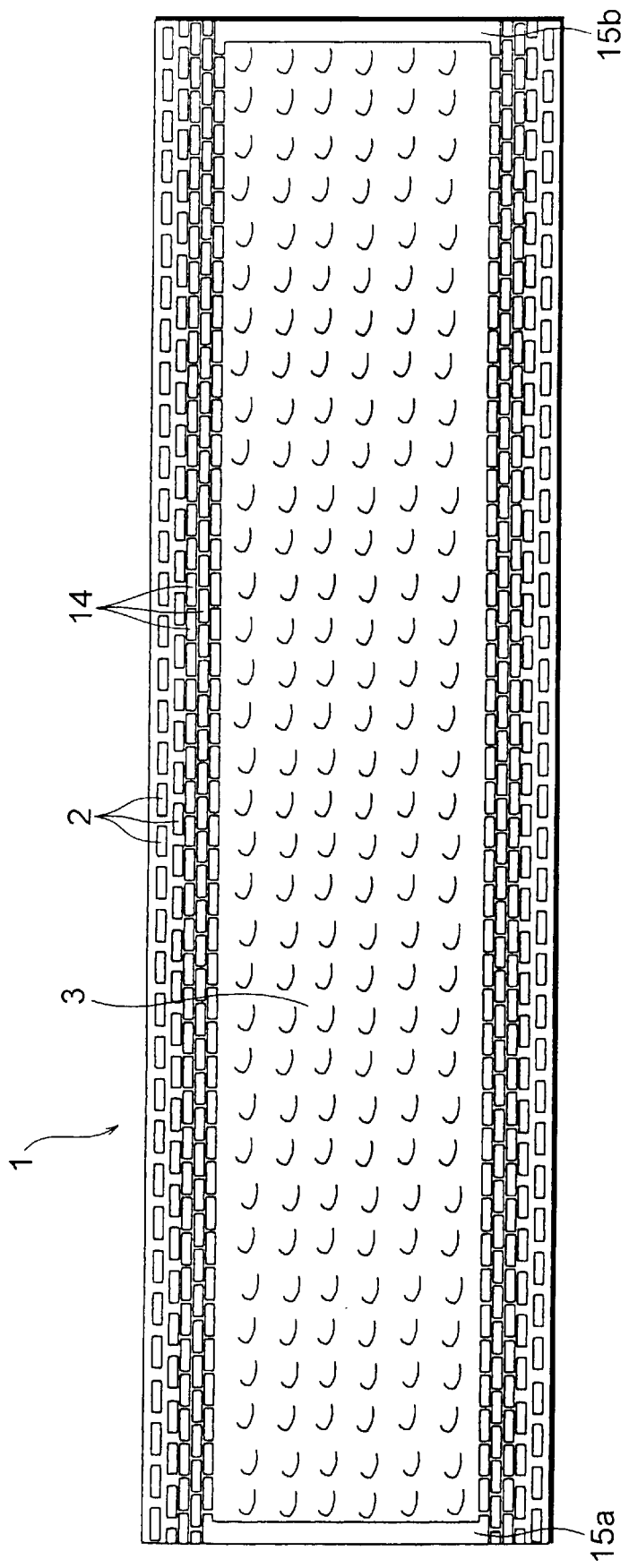
FIG. 11 is a top view of still another embodiment in which a fastener strip has transverse walls for sealing end portions of the strip in order to prevent fouling.
Figure 12:
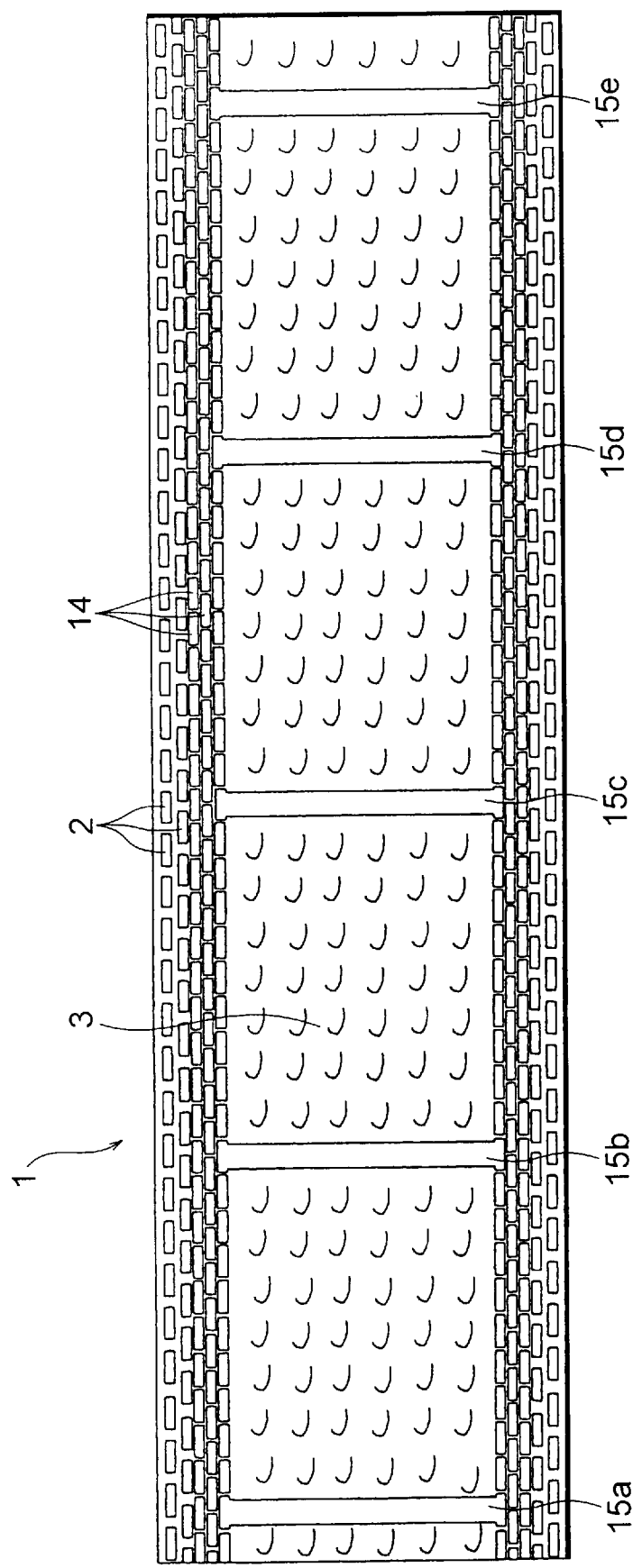
FIG. 12 is a top view of still another embodiment similar to FIG. 11, but in which a plurality of transverse walls are regularly disposed along a length of the fastener layer.

FIGS. 11 and 12 depict alternative embodiments wherein transverse walls are additionally present, to seal the ends of fastener strip 1 against foam intrusion and fouling. In FIG. 11, transverse walls 15a, 15b, 15c, 15d and 15e are located at opposite ends of fastener strip 1. Said transverse walls 15a, 15b, 15c, 15d and 15e are elongated in shape and extend between the closely spaced vertical members 14 located on each side of fastener strip 1. FIG. 12 illustrates a similar alternative embodiment, except that transverse walls 15a, 15b, 15c, 15d and 15e are located at intervals along the length of fastener strip 1. It can be appreciated that the transverse wall arrangement of FIG. 12 allows fastener strip 1 to be manufactured and distributed in long continuous spools, and then cut to the needed length. Specifically, even if fastener strip 1 is cut somewhere between the transverse walls, only a limited number of hook-like fastening elements 3 will be exposed to fouling before the intruding foam is blocked by a transverse wall.

Figure 13:
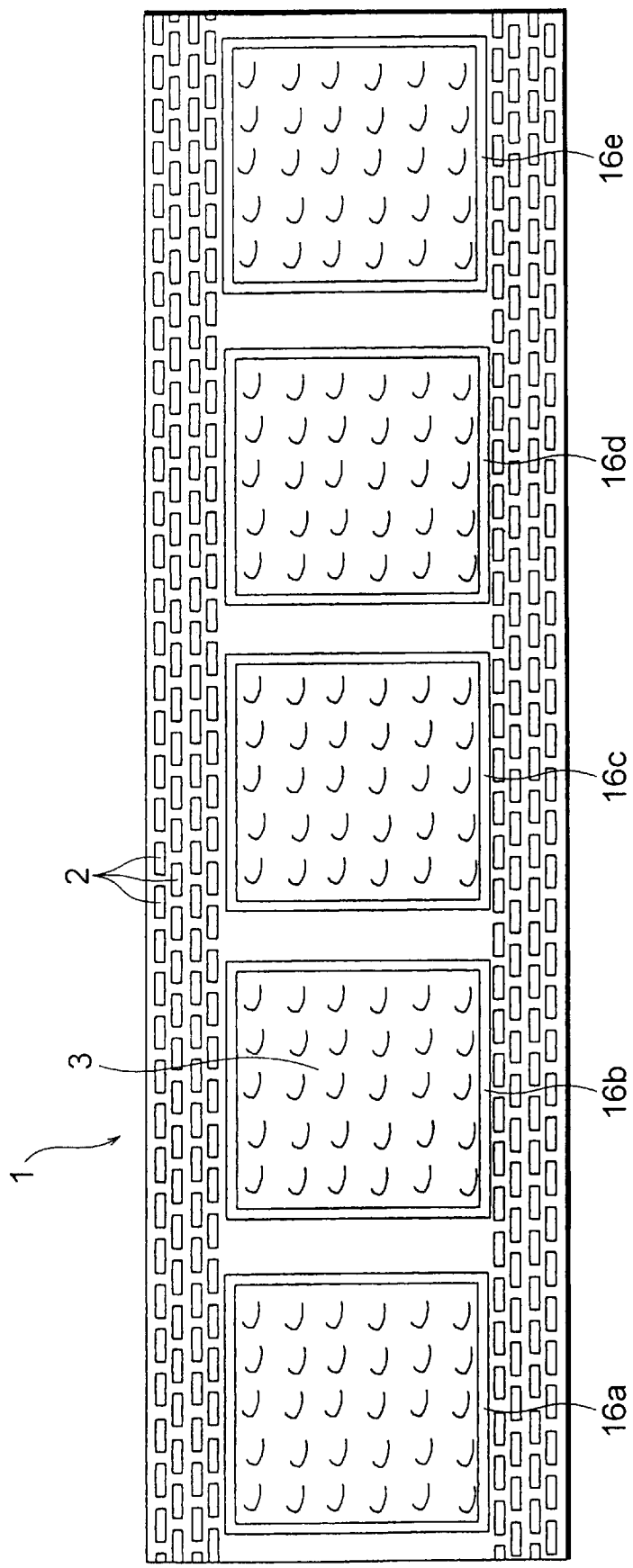
FIG. 13 is a top view of still another embodiment comprising a plurality of perimeter walls for surrounding hooks of the fastener strip.
Figure 14:
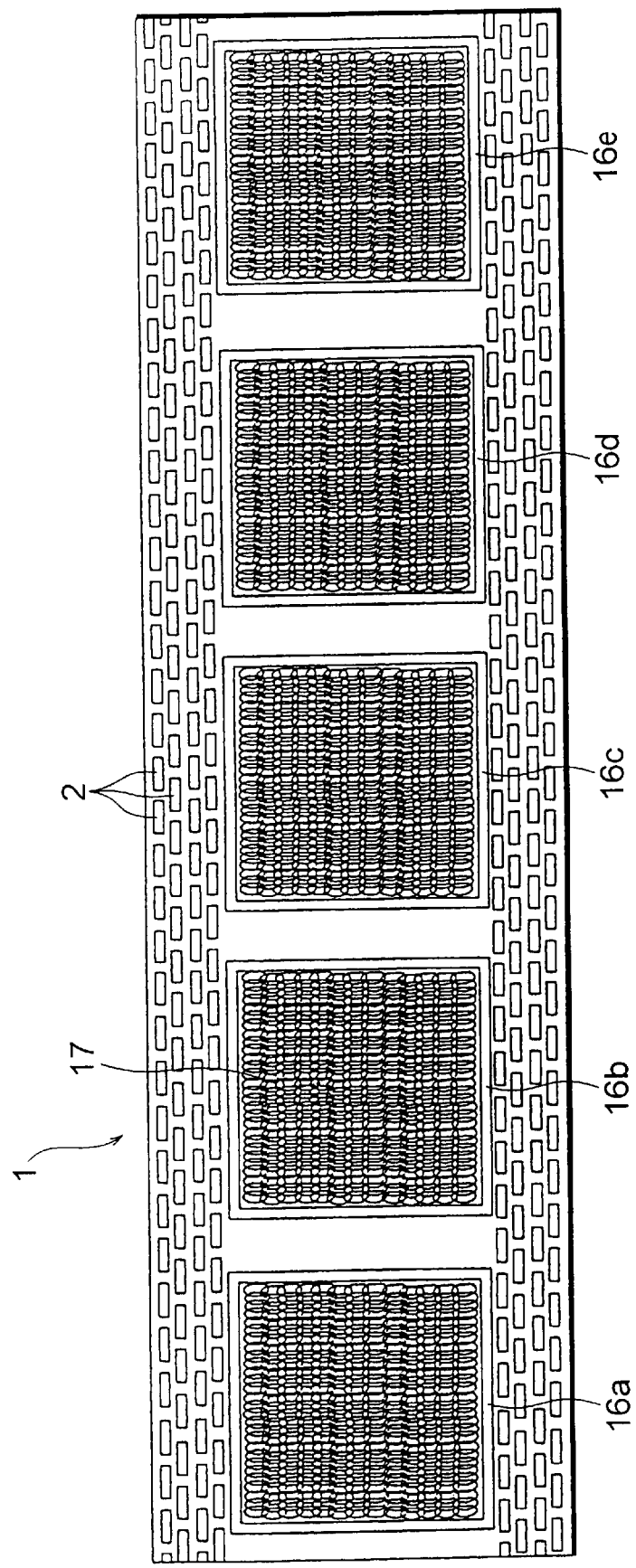
FIG. 14 is a top view of still another embodiment similar to FIG. 6 except that loops are used instead of hooks.

FIGS. 13 and 14 illustrate alternative embodiments wherein perimeter walls 16a, 16b, 16c, 16d and 16e stand upward from the front surface of fastener strip 1, and surround the fastening elements. FIG. 13 depicts a version wherein the fastening elements comprise a plurality of hook-like fastening elements 3, and FIG. 14 depicts a version wherein the fastening elements comprise loop-like fastening elements 17.

Figure 15:
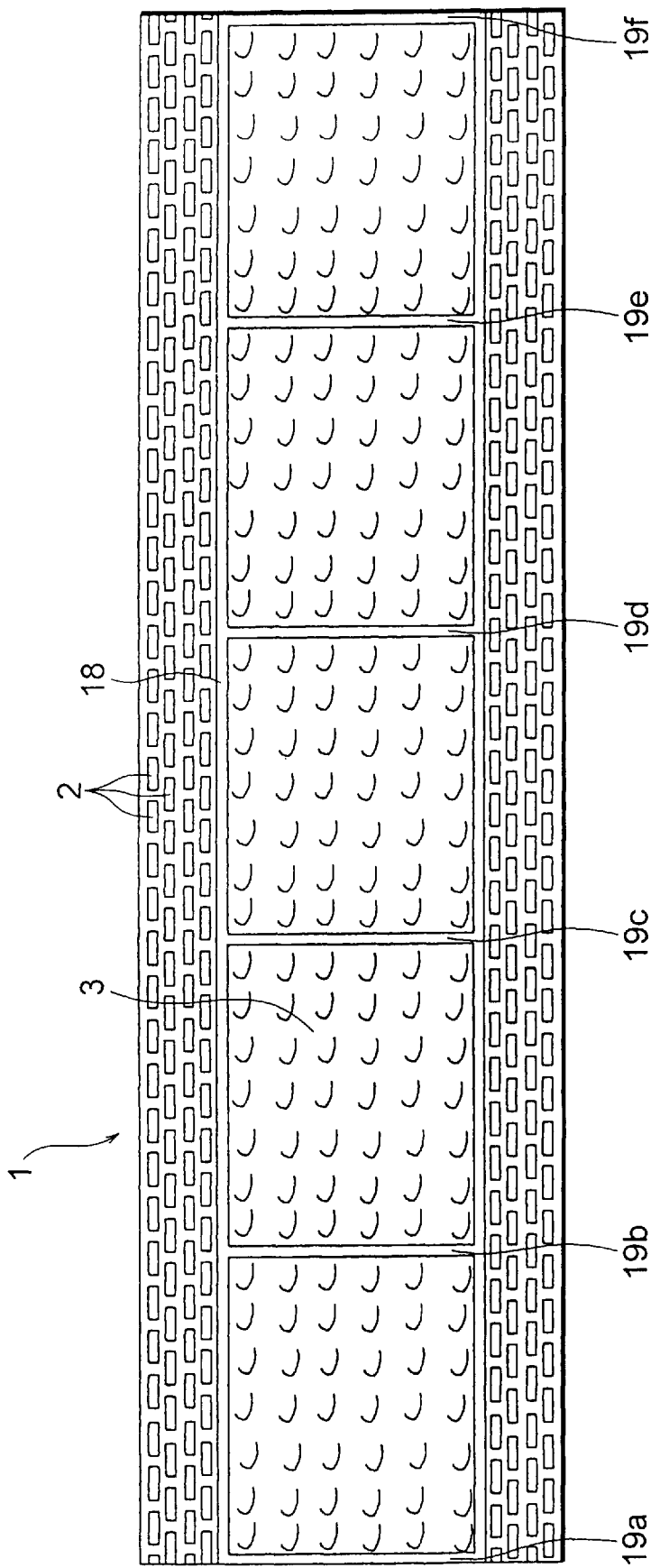
FIG. 15 is a top view of still another embodiment in which the perimeter walls surround the fastening elements such that they form ladders on the surface of a fastener layer.

FIG. 15 shows an alternative embodiment wherein a ladder wall 18, having transverse rungs 19a, 19b, 19c, 19d, 19e and 19f, surrounds hook-like fastening elements 3 to prevent the intrusion of foam and consequent fouling during the molding process. The structure of ladder wall 18 allows fastener strip 1 to be manufactured and distributed in long continuous spools, and then cut to length as needed. Specifically, even if fastener strip 1 is cut somewhere between the transverse rungs, only a limited number of hook-like fastening elements 3 will be exposed to fouling before the intruding foam is blocked by a transverse rung. Moreover, the structure of ladder wall 18 allows for a greater number of hook-like fastening elements 3, for a given length of fastener strip 1, than do the embodiments of FIGS. 13 and 14.

Figure 16:
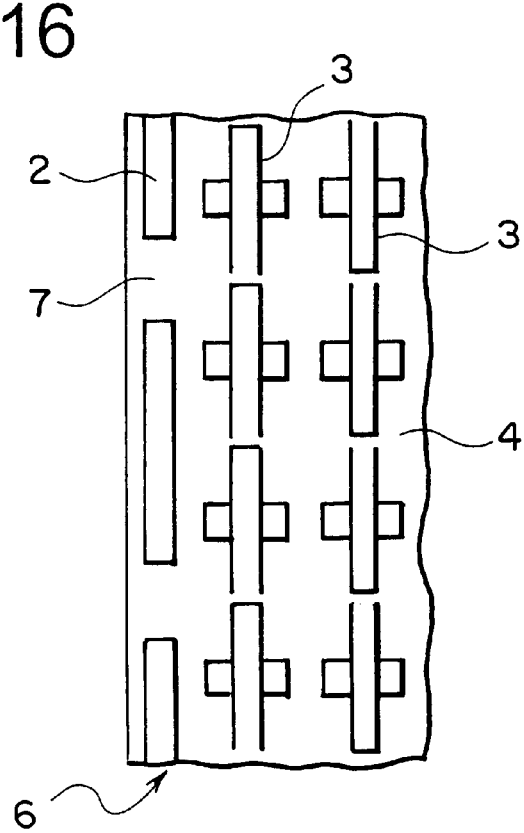
FIG. 16 is a plan view of the fastener strip in which a single row of vertical members is formed along the side edge.

FIG. 16 shows a case where a row of the vertical members 2 is disposed. In this case, a group of the fastening elements 3 adjacent the vertical members 2 block penetration of the foam resin 10 as well as serve as anchor members for not allowing separation between the foam resin and the surface fastener 1 after the foam resin 10 penetrates around the fastening elements 3 to hold them.

Figure 17:
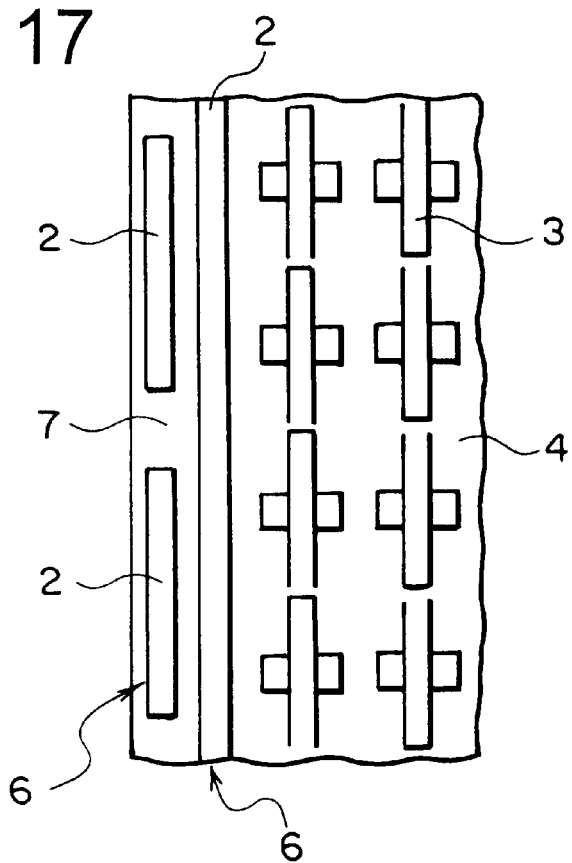
FIG. 17 is a partial plan view of the fastener strip in which two rows of vertical members are formed along the side edge and the inner vertical member is continuous.

FIG. 17 shows a case where a second row of the vertical members 2 is continuous. In this case, the foam resin 10, which invades through the gaps 7 of the first row of the vertical members 2, is blocked from penetration into the area of the fastening elements 3 by the continuous vertical member 2.

Figure 18:
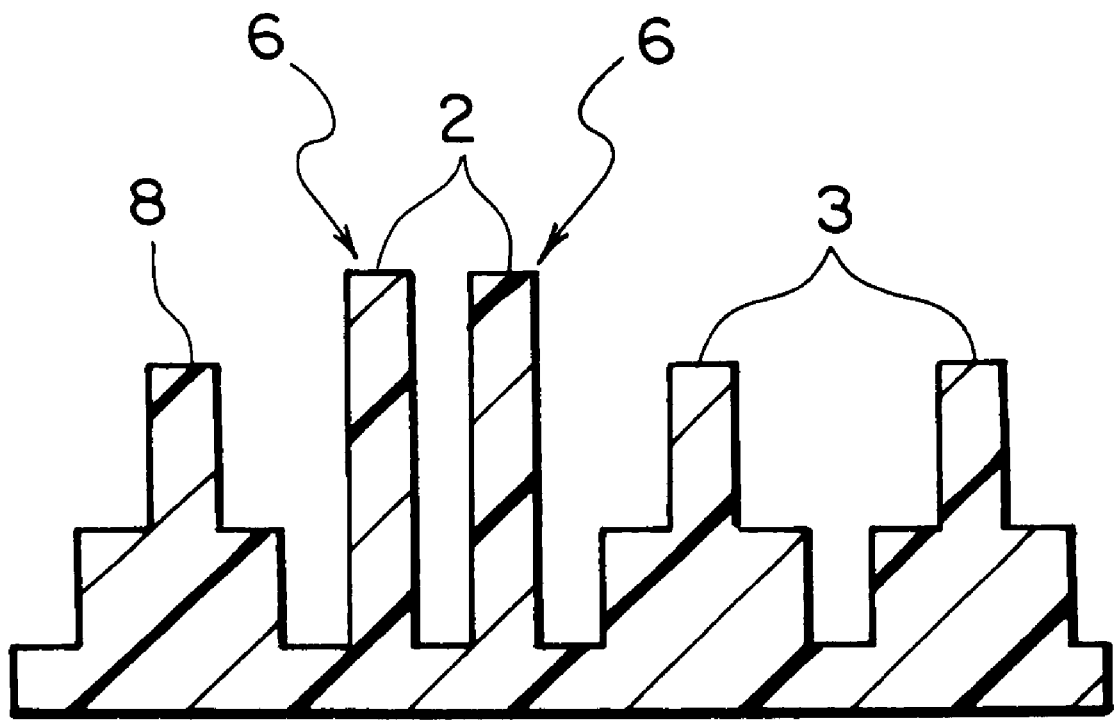
FIG. 18 is a longitudinal sectional view of the fastener strip, which is a modification of the fastener strip, in which an anchor element is formed outside the vertical members located along the side edge.
Figure 19A:
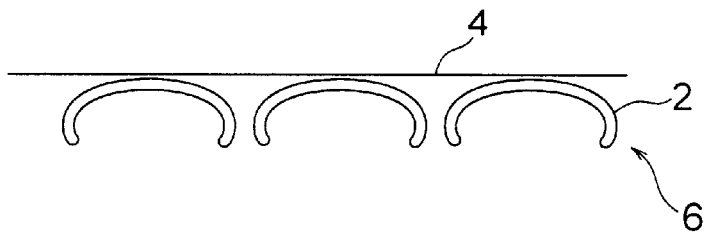
FIGS. 19 A through C are plan views of C-shaped vertical members.
Figure 19B:
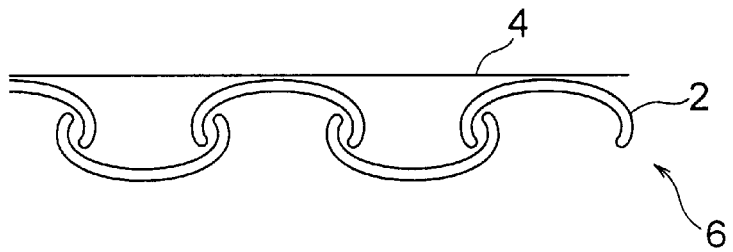
Figure 19C:
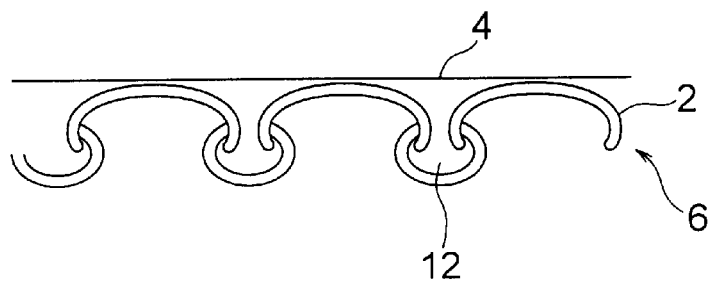
Figure 20A:
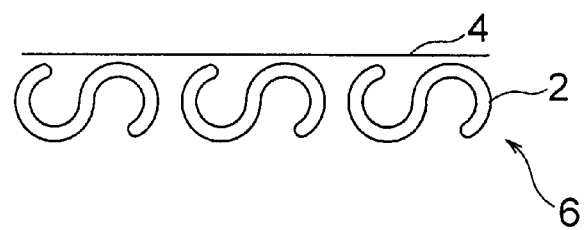
FIGS. 20 A through C are plan views of S-shaped vertical members.
Figure 20B:
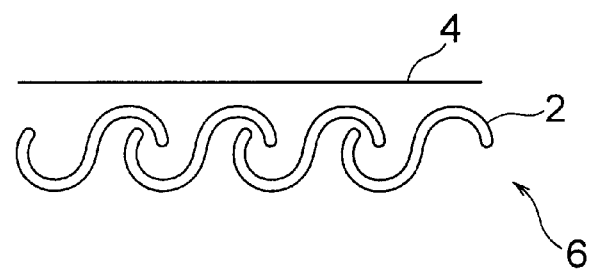
Figure 20C:
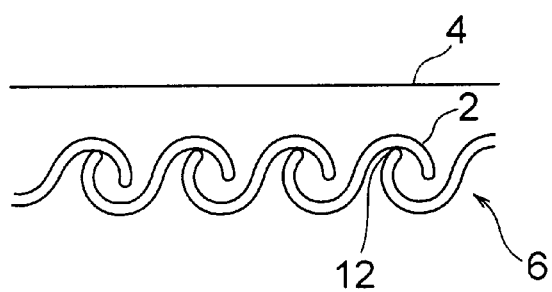
Figure 21A:
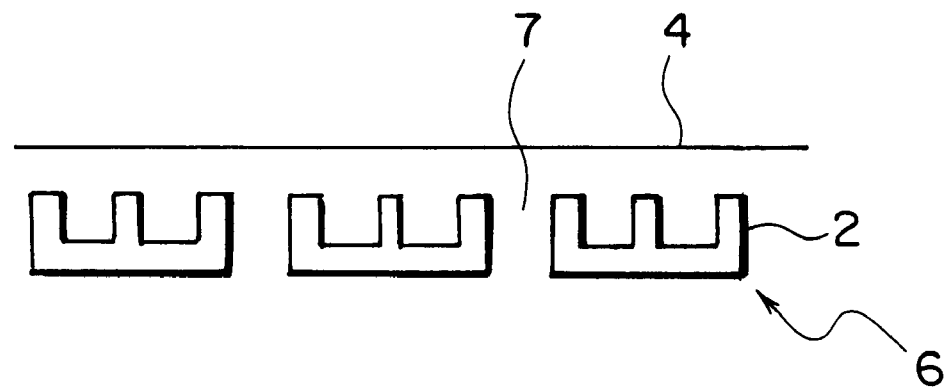
FIGS. 21 A through C are plan views of E-shaped vertical members.
Figure 21B:
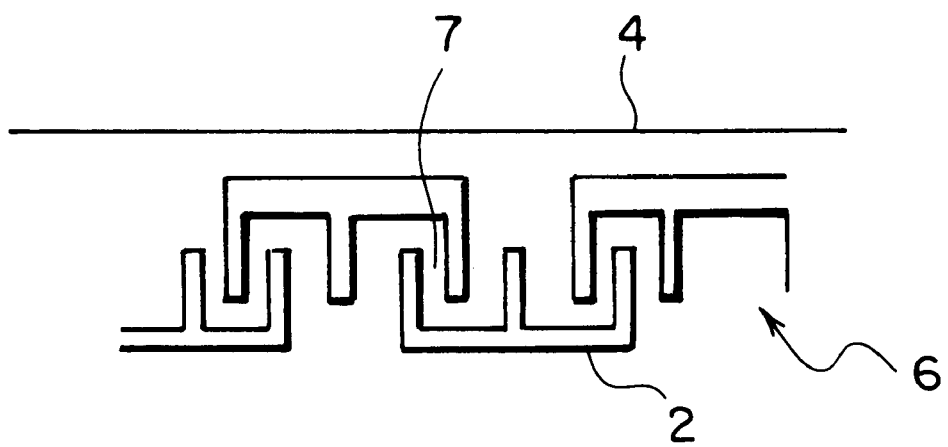
Figure 21C:
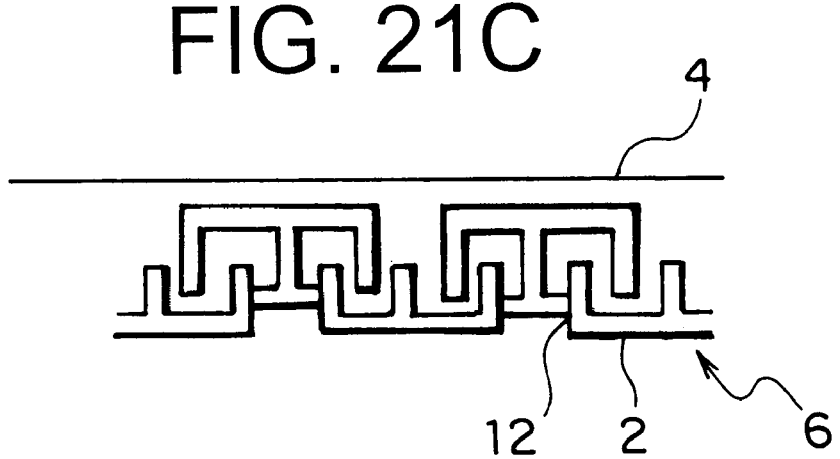
Figure 22A:
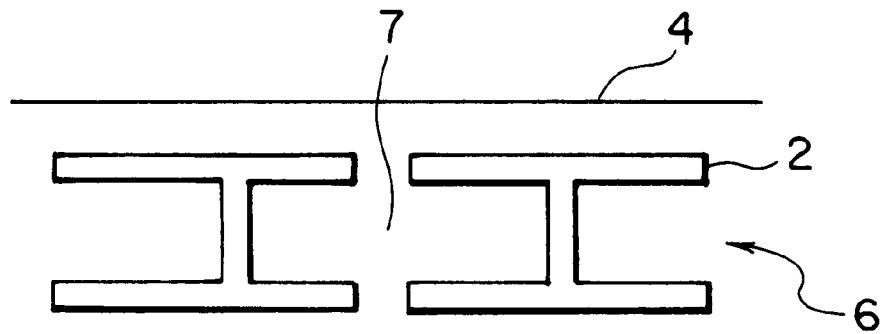
FIGS. 22 A through C are plan views of H-shaped vertical members.
Figure 22B:
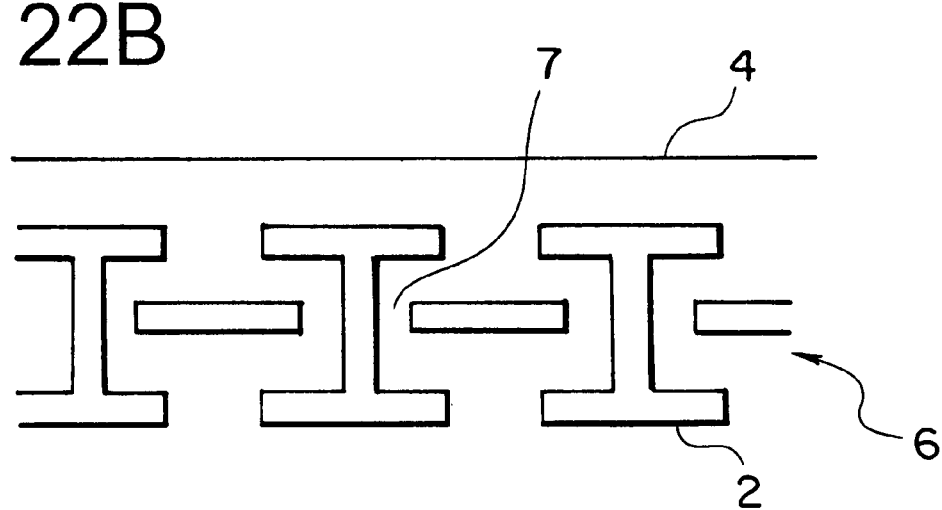
Figure 22C:
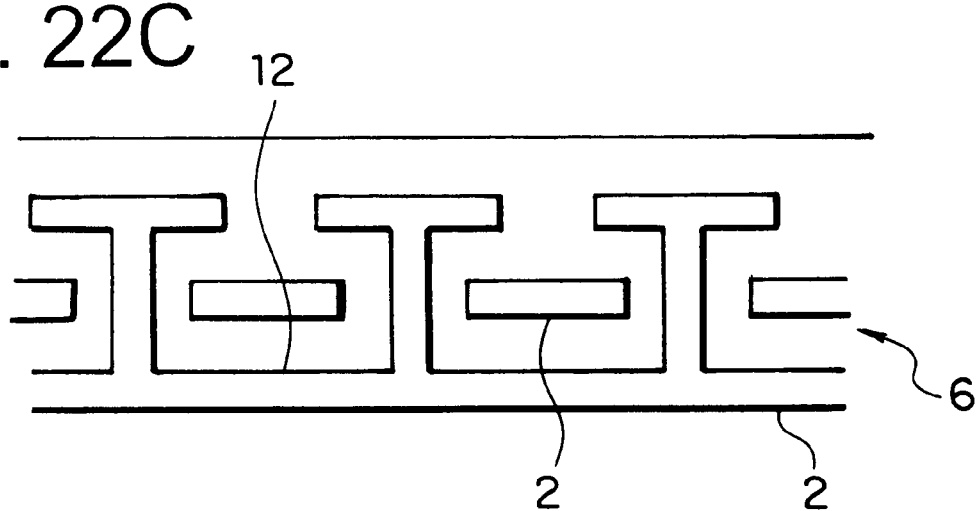

FIG. 18 shows an example of a modification of the surface fastener 1 in which an anchor element 8, which is provided with a anchoring function to a fastener strip 1, is formed outside two rows of the vertical members 2. Although two rows of vertical members 2 are formed in this case, it is permissible to provide a single row or plural rows thereof. The anchor element 8 disposed outside the vertical members 2 has the same configuration as the hook-like fastening element 3. When the foam resin penetrates in between the hooks and the substrate, it surrounds the anchor element 8 to anchor the fastener strip 1 so that the fastener strip 1 cannot be separated. Meanwhile, the anchor element 8 is not restricted to the same shape as the fastening element, but may be formed in any shape that is required for exerting a function as an anchor.

Figure 23A:
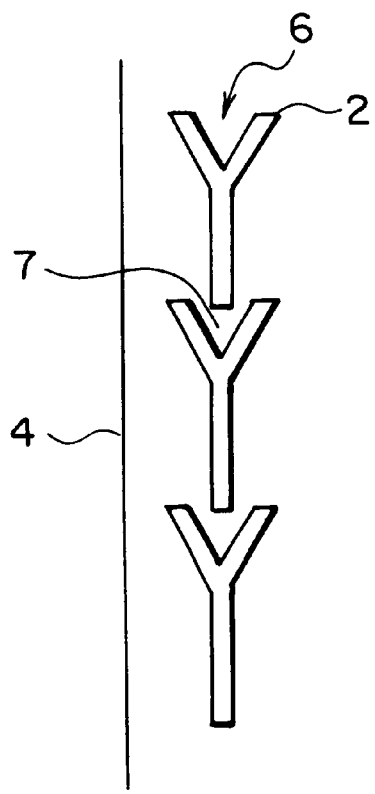
FIGS. 23 A and B are plan views of Y-shaped vertical members.
Figure 23B:
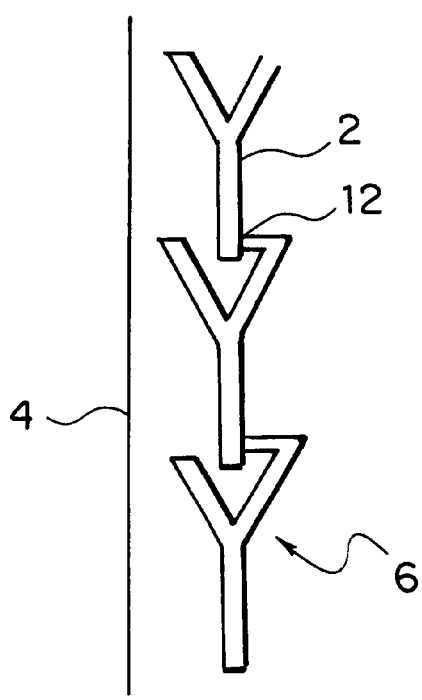
Figure 24A:
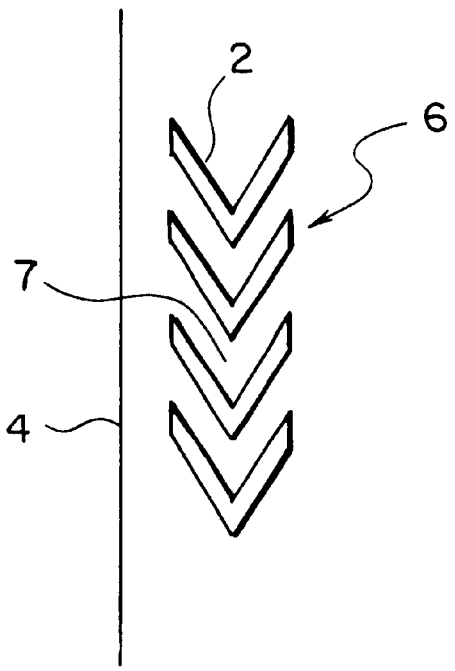
FIGS. 24 A and B are plan view of V-shaped vertical members.
Figure 24B:
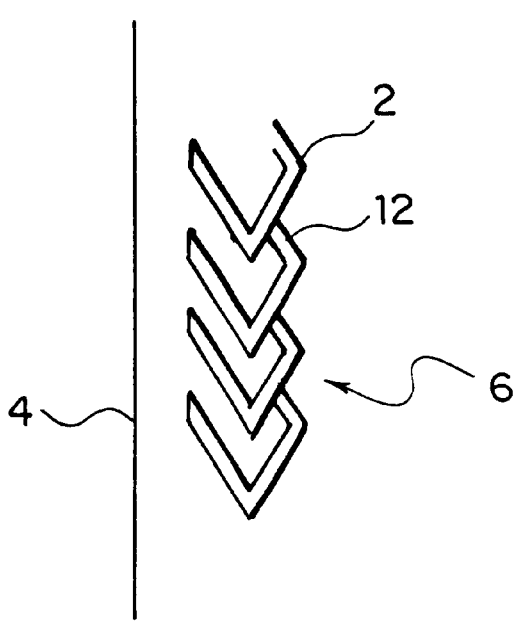
Figure 25A:
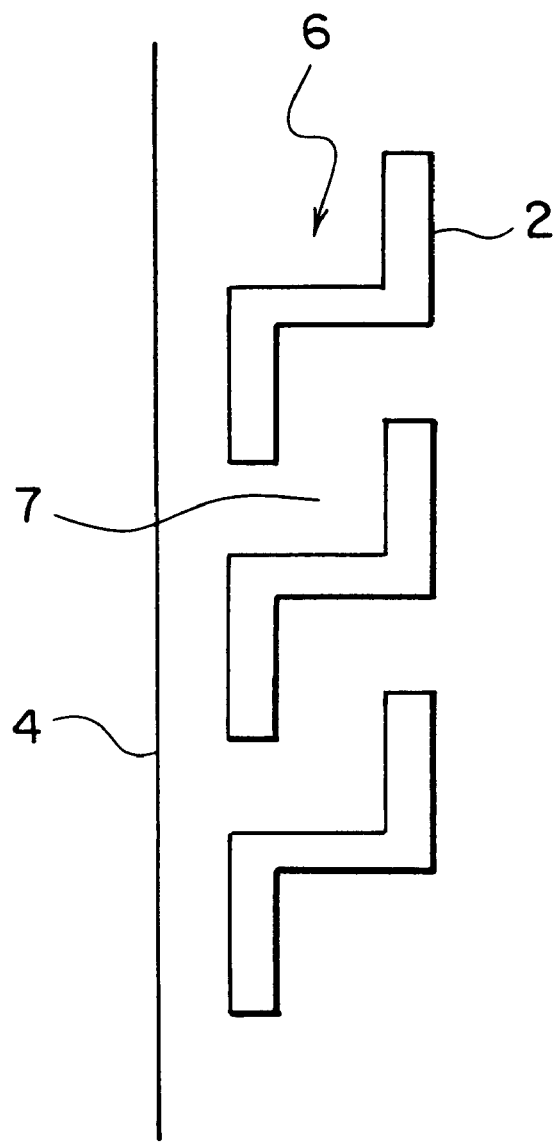
FIGS. 25 A and B are plan views in which intermediate portions of the vertical members are bent.
Figure 25B:
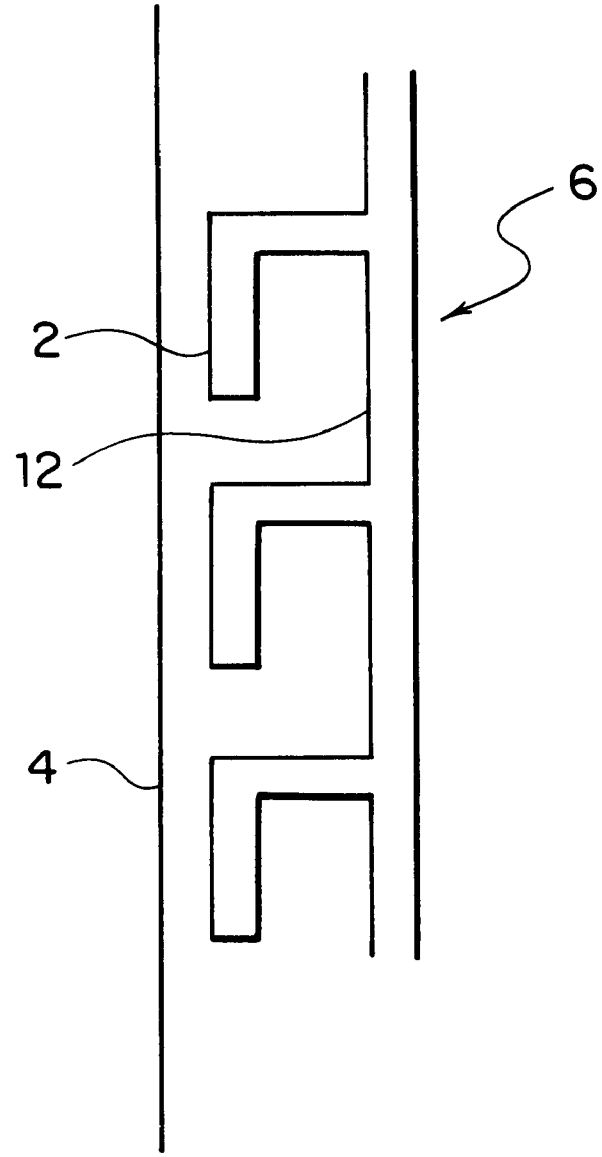
Figure 26A:
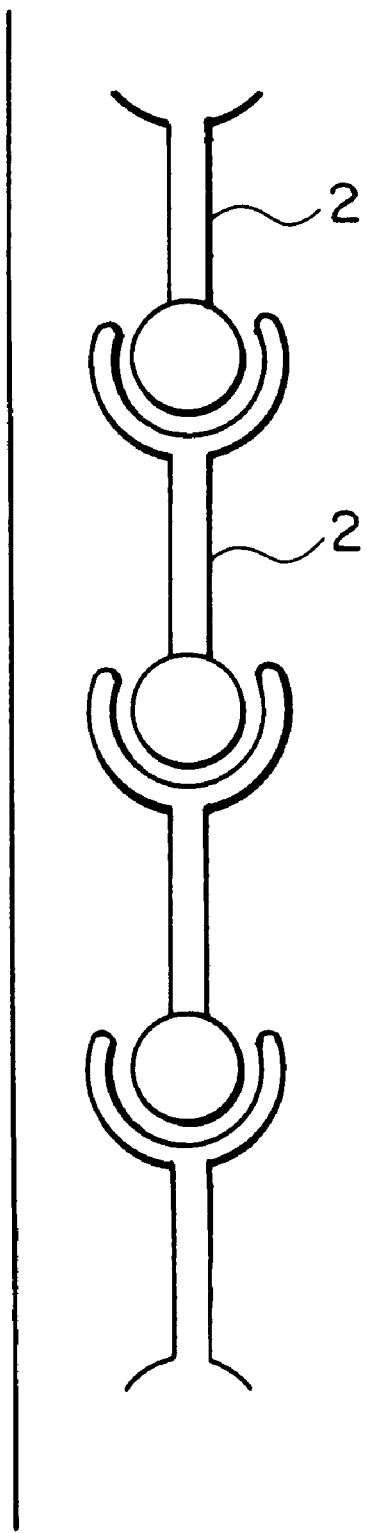
FIGS. 26 A and B are plan views of vertical members each having such a shape that its one end is branched to form two arc portions while the other end is provided with a cylindrical portion.
Figure 26B:
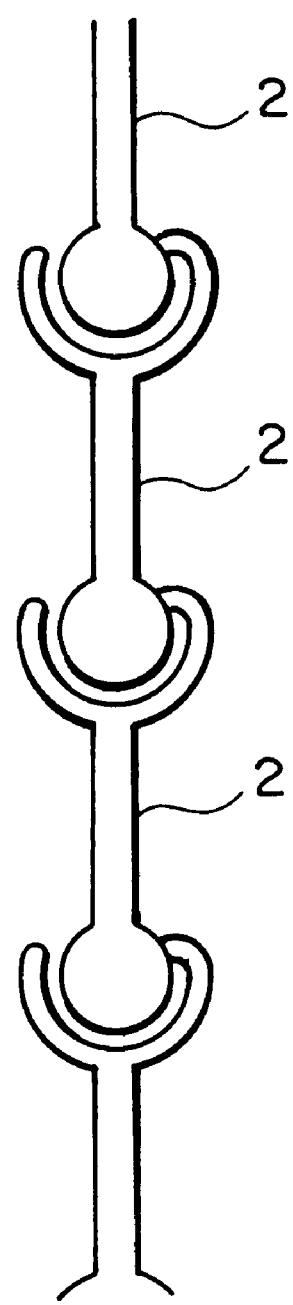

"A" figures of FIGS. 19 to 25 show various modifications of the vertical members. Additionally, any vertical member of a configuration other than those shown here may be used, if it is available, as the vertical member of the present invention. For example, S-shaped vertical members shown in FIG. 20 may be replaced with inverted S-shaped vertical members. "A" figures of FIGS. 21 to 24 show cases where end portions of the vertical members are bent. Even vertical members having such bent end portions can achieve the objective of the present invention. "B" figures of FIGS. 19 to 22 and "A" figures of FIGS. 23 to 25 show various shapes where aisles of a predetermined length are formed in the passage direction of the foam resin as gaps between the vertical members. "C" figures of FIGS. 18 to 22 and "B" figures of FIGS. 23 to 26 show cases where stopper portions 12 are formed in the aisles. These stopper portions 12 block the penetration of the foam resin 10 passing through the gaps between the vertical members 2.

The configurations of the vertical members 2 shown in FIGS. 19 to 26 are only exemplification, and any configuration of the vertical members is permitted so long as it can achieve the objective of the invention. Further, vertical members each having the configuration capable of achieving the objective of the invention can be combined. It is also permissible to combine the vertical members of such configurations with continuous vertical members. Further, the rows of the vertical members 2 may be two or three or any number required.

Figure 27:
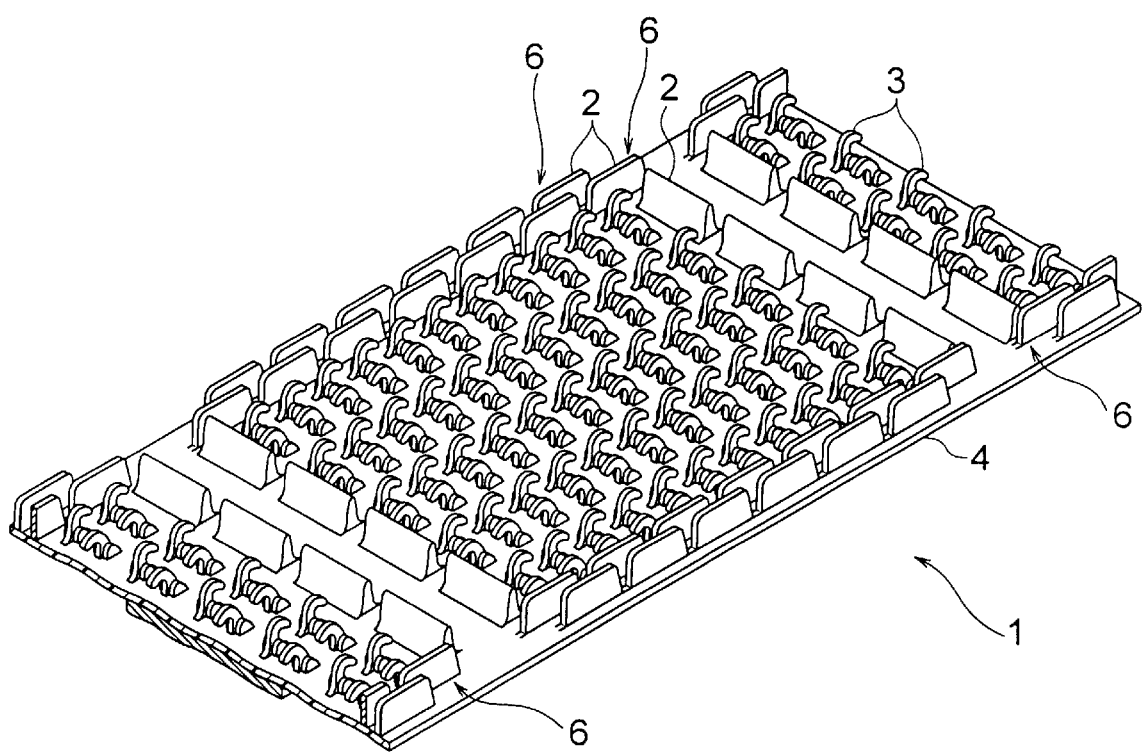
FIG. 27 is a perspective view of a fastener strip in which a group of fastening elements is surrounded a plurality of spaced vertical members.

FIG. 27 shows a case where the foam resin 10 invading through gaps 7 between the vertical members 2, surrounding a group of fastening elements 3, is restricted from penetration into the area of the fastening elements 3 and at the same time the foam resin 10 invading through the gaps 7 between the vertical members 2 penetrates up to the rear faces of the vertical members 2. By filling the gap between the vertical members 2 adjacent in the length direction with the foam resin 10, the fastener strip 1 can be anchored more firmly to a molded product.

Although according to this embodiment, flat spaces are formed between the transverse rows of vertical members 2, it is permissible to provide the spaces with anchor elements.

Figure 28:
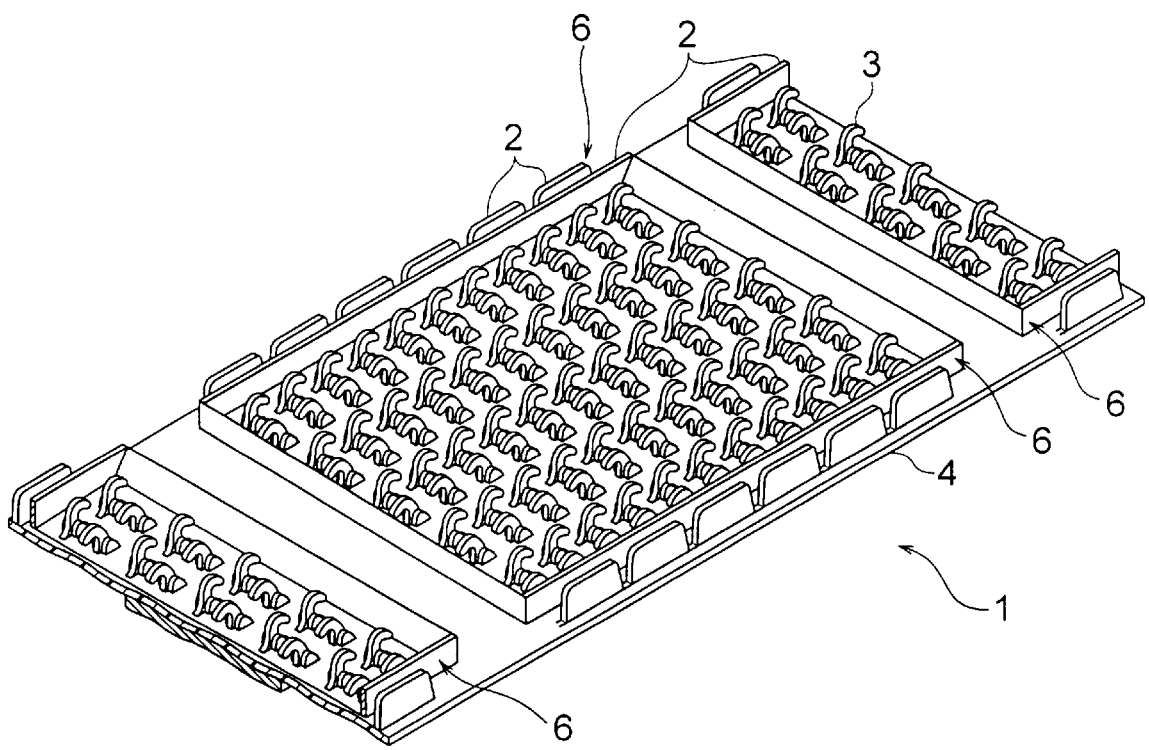
FIG. 28 is a perspective view of a fastener strip in which the vertical members which surround a group of the fastening elements comprise continuous perimeter walls.

FIG. 28 shows a case where vertical members 2 shown in FIG. 27 are replaced with a continuous vertical member 2, to form a perimeter around the hook-like fastening elements 3. Although FIG. 28 shows a case where a single row of vertical members 2 is provided for surrounding a group of the fastening elements 3, it is permissible to provide two or more rows.

Figure 29:
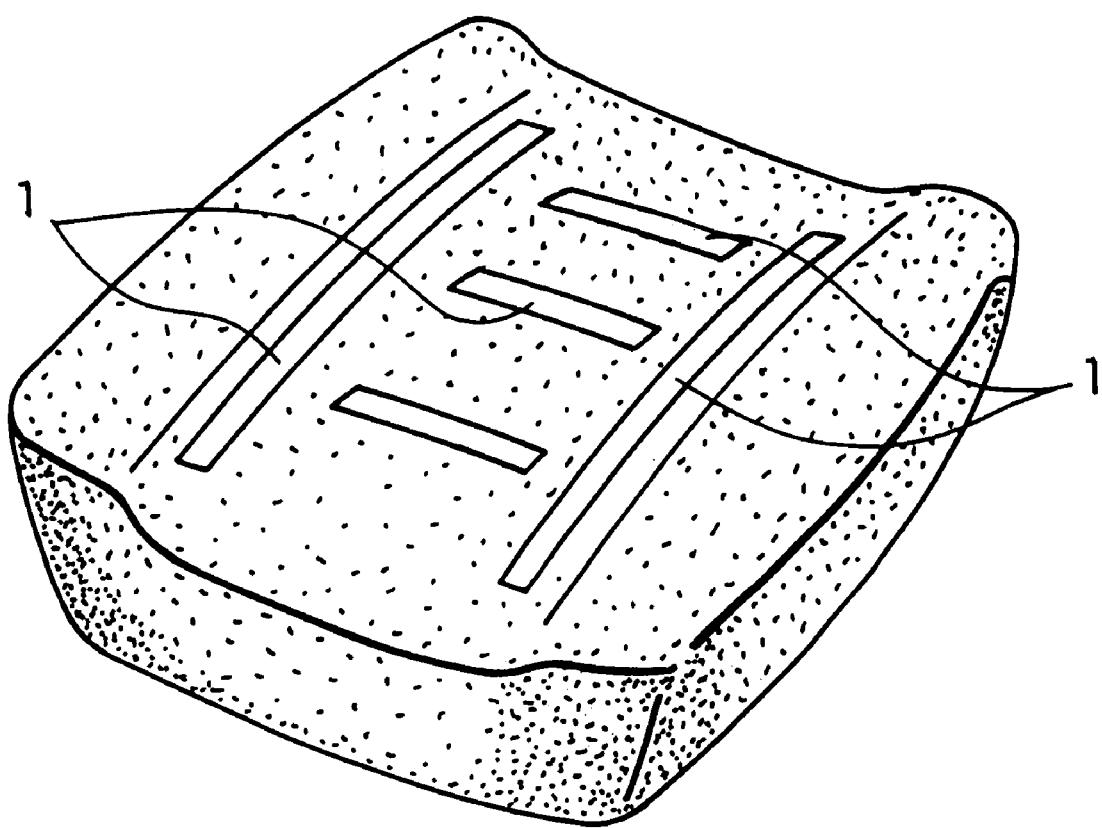
FIG. 29 is a perspective view of a foam-molded product in which the fastener strip is anchored integrated at a specified position of a surface thereof.

FIG. 29 shows an embodiment in which the fastener strip 1 is integrated with a foam-molded product. The surface fastener strip 1 is used to prevent a surface material covering the foam-molded product having an indented configuration from separating. The fastener strip 1 is disposed at a position where the surface material is likely to separate.

Thus the reader will see that this invention provides a very effective way of controlling the degree of foam penetration during the molding process. The vertical members can act to both anchor the fastener strip 1 to an object as that object is molded, and also form an effective seal against fouling of the fastening elements.

While the above descriptions contain many specificities, these shall not be construed as limitations on the scope of the invention, but rather as exemplifications of embodiments thereof. Many other variations are possible. Examples of just a few of the possible variations follow:

The fastener strip 1 can be of any shape, including circular or square-shaped, and not just the rectangular strip shape shown in the various embodiments above. The basic concept of the invention—vertical sealing members which seal the fastening elements against fouling—is applicable to fastener strips having many different shapes.

The vertical members 2 do not have to be block-shaped-as several examples, they can also be actuate or salient-shaped, can be comprised of vertical hook-like fastening elements, or can have a diamond, circle, triangle, or "X" shape. Differently-shaped vertical members 2 can also be used in "mixed" fashion on the fastener strip 1. The length, width, and height of the vertical members 2 can also be different than that shown in the main and alternative embodiments.

The vertical members 2 do not have to be molded of one piece with the rest of fastener strip 1. One-piece construction is obviously preferable for most efficient and lowest-cost manufacturing, but if necessary, the rows of vertical members 2 can be formed separately from the rest of the fastener strip 1 and later attached. If this is the case, the vertical members 2 may of course be made of material different from that used for the rest of the fastener strip 1.

The spacing between adjacent vertical members 2 in each row, and between adjacent rows of vertical members 2, can be different than that shown in FIGS. 8, 13, 14, and 15. Different spacing, at least for the inner rows of vertical members 2, is in fact shown in FIGS. 10, 11, and 12; however, many other spacing variations are certainly possible. As just one example, closely spaced vertical members can be used in conjunction with the perimeter walls of FIGS. 13 and 14, or with the ladder structure of FIG. 15, in order to provide an extra measure of sealing effectiveness.

The vertical members concept can also be used to anchor and/or seal the ends of the fastener strip 1, and not just the sides as shown in the main and alternative embodiments.

A version can easily be envisioned wherein closely spaced vertical members 2 are located at the very outer edges of the fastener strip, and not inward a few rows as in FIGS. 10, 11, and 12. In this version, very little if any foam penetration would take place. Consequently, little or no anchoring effect would be achieved, and the use of other anchoring means would be appropriate.

The fastener strip 1 of the invention can be used with a mold having a recess or trench, or with a "trench-less" mold. If used with a trench-less mold, the vertical members 2 should have a height greater than or equal to the height of the fastening elements 3—so that when the fastener strip is laid into the mold, the vertical members 2 can firmly contact the mold surface. If the fastener strip 1 is used with a mold having a recess or trench, the vertical members 2 can potentially be of a lesser height than the fastening elements 3, if the vertical members 2 are intended to fit on the top of the recess wall, and the fastening elements 3 are intended to fit,down into the mold recess. A third situation can also be envisioned, wherein the full width of the fastener strip 1, i.e., both the vertical members 2 and fastening elements 3, fit within the mold recess. In this case, the vertical members 2 can have a height greater than, equal to, or even less than the height of the fastening elements 3.

The members located at the outer edges of the fastener strip 1 are shown and referred to as "staggered", because obviously some degree of staggering or overlap helps to deter foam penetration by forming a tortuous path between successive rows of members. However, not all successive rows need be staggered vs. each other, and the degree of staggering need not be constant or consistent over the length and width of the fastener strip 1. All that is required is that the plurality of vertical sealing members located at the outer edges of the fastener strip 1 present a sufficient impediment to foam penetration, so that the fastening elements 3 remain unfouled during the molding process.

Any suitable end sealing means can be used, and not just the transverse walls shown in FIGS. 11 and 12, or the transverse rung shown in FIG. 15.

As demonstrated by FIG. 14, the fastening elements can be loop-like fastening elements, and do not have to be hook-like fastening elements as in the other figures. Indeed, other types of fastening elements, not just hooks or loops, can also be used.

Accordingly, the scope of the invention should be determined not by the embodiments illustrated, but by the appended claims and their legal equivalents.

What is claimed is:

1. A fastening device for being molded into an object, comprising:
   (a) a base comprising first and second major surfaces, first and second opposed ends, and first and second opposed side edges,
   (b) a plurality of fastening elements upstanding from said first major surface of said base,
   (c) a plurality of staggered members upstanding from said first major surface of said base between said fastening elements and said edge of said base, for controlling the degree of foam intrusion from said edge of said base during a molding process, and
   (d) means for preventing foam intrusion at said ends of said base that comprise a transverse wall located at each end of said base,
whereby said fastening device can be molded into said object without said foam fouling said fastening elements.

2. A fastening device for being molded into an object, comprising:
   (a) a base comprising first and second major surfaces, first and second opposed ends, and first and second opposed side edges,
   (b) a plurality of fastening elements upstanding from said first major surface of said base,
   (c) a plurality of staggered members upstanding from said first major surface of said base between said fastening elements and said edge of said base, for controlling the degree of foam intrusion from said edge of said base during a molding process, and
   (d) means for preventing foam intrusion that comprise a series of transverse walls located at intervals along the length of said base,
whereby said fastening device can be molded into said object without said foam fouling said fastening elements.

3. A fastening device for being molded into an object, comprising:
   (a) a base comprising first and second major surfaces and at least one edge,
   (b) a plurality of fastening elements upstanding from said first major surface of said base,
   (c) a plurality of staggered members upstanding from said first major surface of said base between said fastening elements and said edge of said base, for controlling the degree of foam intrusion from said edge of said base during a molding process, and
   (d) a perimeter wall upstanding from said first major surface of said base and surrounding said fastening elements,
whereby said fastening device can be molded into said object without said foam fouling said fastening elements.

4. A fastening device for being molded into an object, comprising:
   (a) a base comprising first and second major surfaces and at least one edge,
   (b) a plurality of fastening elements upstanding from said first major surface of said base,
   (c) a plurality of staggered members upstanding from said first major surface of said base between said fastening elements and said edge of said base, for controlling the degree of foam intrusion from said edge of said base during a molding process, and
   (d) a ladder wall and a plurality of transverse rungs upstanding from said first major surface of said base and surrounding said fastening elements,
whereby said fastening device can be molded into said object without said foam fouling said fastening elements.

5. The fastening device of claim 1, 2, 3, or 4, wherein said staggered members comprise overlapping rows of blocks.

6. The fastening device of claim 1, 2, 3, or 4, wherein said staggered members are substantially evenly spaced along their extent from said edge of said base inward to said fastening elements.

7. The fastening device of claim 1, 2, 3, or 4, wherein said staggered members are variably spaced along their extent from said edge of said base inward to said fastening elements.

8. A fastening device for being molded into an object, comprising:
   (a) a base comprising first and second major surfaces, first and second opposed ends, and first and second opposed side edges,
   (b) a plurality of hook fastening elements upstanding from said first major surface of said base,
   (c) a plurality of staggered members upstanding from said first major surface of said base between said hook fastening elements and said side edges of said base, for controlling the degree of foam intrusion from said side edges of said base during a molding process, and
   (d) means for preventing foam intrusion that comprise a transverse wall located at each end of said base,
whereby said fastening device can be molded into said object without said foam fouling said hook fastening elements.

9. A fastening device for being molded into an object, comprising:
   (a) a base comprising first and second major surfaces, first and second opposed ends, and first and second opposed side edges,
   (b) a plurality of hook fastening elements upstanding from said first major surface of said base,
   (c) a plurality of staggered members upstanding from said first major surface of said base between said hook fastening elements and said side edges of said base, for controlling the degree of foam intrusion from said side edges of said base during a molding process, and (d) means for preventing foam intrusion that comprise a series of transverse walls located at intervals along the length of said base, whereby said fastening device can be molded into said object without said foam fouling said hook fastening elements.

10. The fastening device of claim 8 or 9, wherein said staggered members comprise overlapping rows of blocks.

11. A fastening device for being molded into an object, comprising:
   (a) a base comprising first and second major surfaces and at least one edge,
   (b) a plurality of hook fastening elements upstanding from said first major surface of said base,
   (c) overlapping rows of blocks upstanding from said first major surface of said base between said hook fastening elements and said edge of said base, for controlling the degree of foam intrusion from said edge of said base during a molding process, and
   (d) a perimeter wall upstanding from said first major surface of said base and surrounding said hook fastening elements, whereby said fastening device can be molded into said object without said foam fouling said hook fastening elements.

12. A fastening device to be integrated with a surface of a foam-molded product for fixing a surface material, in which at least one row of vertical sealing members is formed on each side edge of said fastening device along a length of a surface of a flat substrate made of thermoplastic resin thereof, and a plurality of fastening elements are formed in an area surrounded by said vertical sealing members, wherein said vertical sealing members are arranged in line along the length of said substrate, wherein gaps allowing passage of a foam resin are formed between said vertical sealing members adjacent to each other, and wherein said substrate additionally comprises a continuous transverse wall disposed on an end portion of said substrate.

13. A fastening device to be integrated with a surface of a foam-molded product for fixing a surface material, in which at least one row of vertical sealing members is formed on each side edge of said fastening device along a length of a surface of a flat substrate made of thermoplastic resin thereof, and a plurality of fastening elements are formed in an area surrounded by said vertical sealing members, wherein said vertical sealing members are arranged in line along the length of said substrate, wherein gaps allowing passage of a foam resin are formed between said vertical sealing members adjacent to each other, and wherein said substrate additionally comprises continuous transverse walls disposed at predetermined intervals along the length thereof.

14. A fastening device according to claim 12 or 13, wherein at least part of said substrate, said fastening elements and said vertical sealing members contain magnetically attractable material.

15. A forming method of a foam-molded product integrated with a fastening device according to claim 14 such that said fastening elements are exposed outward from the surface of said foam-molded product, comprising:
   providing a mold for said foam-molded product with a magnet;
   placing said fastening device such that said fastening elements and said vertical sealing members oppose the surface of said mold and fix said fastening device by attracting it magnetically; and
   after pouring a foam resin material into said mold, foaming said foam resin material so as to form said foam-molded product and at the same time, anchoring said fastening device on the surface of said foam-molded product integrally.

16. A forming method of a foam-molded product according to claim 15, wherein the surface of said mold on which said fastening device is placed is flat.

17. A forming method of the foam-molded product according to claim 15, wherein said foam-molded product is a cushion body for an automobile.

18. A fastening device according to claim 12 or 13, wherein a magnetically attractable substance is provided at least on a rear face of said substrate.

19. A fastening device according to claim 18, wherein at least part of said substrate, said fastening elements, and said vertical sealing members is composed of thermoplastic resin mixed with magnetically attractable powder.

20. A fastening device according to claim 18, wherein a magnetically attractable laminate layer or a magnetically attractable film containing magnetically attractable powder is provided at least on a top face of said vertical sealing members.

21. A fastening device according to claim 12 or 13 wherein a resin layer mixed with magnetically attractable powder is provided on a rear surface of said substrate.

22. A fastening device for being molded into an object, comprising:
   (a) a base comprising first and second major surfaces and at least one edge,
   (b) a plurality of hook fastening elements upstanding from said first major surface of said base,
   (c) overlapping rows of blocks upstanding from said first major surface of said base between said hook fastening elements and said edge of said base, for controlling the degree of foam intrusion from said edge of said base during a molding process, and
   (d) a ladder wall and a plurality of transverse rungs upstanding from said first major surface of said base and surrounding said hook fastening elements, whereby said fastening device can be molded into said object without said foam fouling said hook fastening elements.

* * * * *